US010955584B2

(12) United States Patent
Chandra et al.

(10) Patent No.: US 10,955,584 B2
(45) Date of Patent: Mar. 23, 2021

(54) PREDICTING MICROCLIMATE

(71) Applicant: Microsoft Technology Licensing, LLC, Redmond, WA (US)

(72) Inventors: Ranveer Chandra, Kirkland, WA (US); Michael Grant, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 301 days.

(21) Appl. No.: 15/962,833

(22) Filed: Apr. 25, 2018

(65) Prior Publication Data

US 2019/0331832 A1 Oct. 31, 2019

(51) Int. Cl.
*G01W 1/10* (2006.01)
*G06N 3/08* (2006.01)
*G01W 1/06* (2006.01)

(52) U.S. Cl.
CPC ................ *G01W 1/10* (2013.01); *G01W 1/06* (2013.01); *G06N 3/08* (2013.01)

(58) Field of Classification Search
CPC ............. G01W 1/10; G01W 1/06; G06N 3/08
USPC ........................................................... 702/3
See application file for complete search history.

(56) References Cited

U.S. PATENT DOCUMENTS

| 4,755,942 A | 7/1988 | Gardner et al. |
| 8,030,949 B2 | 10/2011 | Götz |
| 8,738,189 B2 | 5/2014 | Alexanian |
| 8,849,461 B2 | 9/2014 | Ersavas et al. |
| 9,107,354 B2 | 8/2015 | Martin et al. |
| 10,509,378 B2* | 12/2019 | Jennings ................ G05B 15/02 |
| 2003/0078901 A1* | 4/2003 | Coppola, Jr. ............ G01V 9/02 706/21 |
| 2003/0109964 A1* | 6/2003 | Addink .................. A01G 25/16 700/284 |
| 2003/0220740 A1* | 11/2003 | Intriligator .............. G01W 1/10 702/3 |
| 2012/0109387 A1* | 5/2012 | Martin ................. G05B 19/042 700/284 |

(Continued)

FOREIGN PATENT DOCUMENTS

CN          105574616 A      5/2016

OTHER PUBLICATIONS

"William W.S.Wei, Time Series Regression, Jan. 2011" (Year: 2011).*

(Continued)

*Primary Examiner* — Sujoy K Kundu
*Assistant Examiner* — Aeysha N Sultana
(74) *Attorney, Agent, or Firm* — Schwegman Lundberg & Woessner, P.A.

(57) ABSTRACT

A method can include receiving sensor data from at least three different types of sensor situated in the geographic area, the types of sensors including an air temperature sensor, relative humidity sensor, dewpoint sensor, soil moisture sensor, soil temperature sensor, average wind speed sensor, maximum wind speed sensor, and a rainfall sensor, producing a feature vector including a time series of values corresponding to the received sensor data, and using a neural network, estimating the physical characteristics, the physical characteristics including at least one of (a) a leaf wetness, (b) a solar radiation, (c) an evapotranspiration, (d) a future soil moisture, and (e) a future soil temperature.

12 Claims, 14 Drawing Sheets

(56) References Cited

U.S. PATENT DOCUMENTS

| | | | | |
|---|---|---|---|---|
| 2012/0261486 A1* | 10/2012 | Sarver | .................. | A01G 25/167 |
| | | | | 239/11 |
| 2015/0370935 A1* | 12/2015 | Starr | ...................... | G06Q 50/02 |
| | | | | 703/11 |
| 2016/0259309 A1* | 9/2016 | Bangalore | .............. | A01G 25/16 |
| 2017/0228743 A1* | 8/2017 | Cousins | ............. | G06Q 30/0202 |
| 2017/0371073 A1* | 12/2017 | Suzuki | .................... | H02J 3/382 |

OTHER PUBLICATIONS

Amir, Fatthy, "Leaf Wetness Duration Modelling using Adaptive Neuro Fuzzy Inference System", In Master Thesis of Auckland University of Technology, Jun. 2016, 99 Pages.

* cited by examiner

FIG. 2

PREDICTING MICROCLIMATE

BACKGROUND

A geographical region, even a smaller geographical region, may be quite diverse in composition. For example, altitude and temperature may be correlated. Even in geographical regions with similar altitudes, the surrounding terrain may make one portion of the geographical region habitable and another nearby portion uninhabitable. In another example, moisture may run down one side of the hill, making a moisture profile of soil on both sides of the hill different. In a further example, a side of the hill that is facing north (in the northern hemisphere or south in the southern hemisphere) generally receives less sunlight and tends to remain moist longer and have lower temperature than a side of the hill facing another direction. This diversity in geographical regions makes it difficult to gain and retain knowledge of the different climate and land conditions in and around the geographical regions.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed in this summary section are not intended to provide limitation to the elements of the claimed subject matter.

Processing circuitry can be configured to predict a physical characteristic of a geographic area, the processing circuitry configured to receive sensor data from sensors situated in the geographic area, produce a feature vector including a time series of values corresponding to the sensor data, and using a neural network, estimate the physical characteristics, the physical characteristics including at least one of (a) a leaf wetness, (b) a solar radiation, (c) an evapotranspiration, (d) a future soil moisture, and (e) a future soil temperature.

A non-transitory machine-readable medium can include instructions that, when executed by a machine, configure the machine to perform operations to predict a physical characteristic of a geographic area, the operations comprising producing a feature vector including a time series of values corresponding to sensor data from sensors of the geographic area, and using a neural network, estimating the physical characteristics, the physical characteristics including at least one of (a) a leaf wetness, (b) a solar radiation, (c) an evapotranspiration, (d) a future soil moisture, and (e) a future soil temperature.

A method for predicting a physical characteristic of a geographic area can include receiving sensor data from at least three different types of sensor situated in the geographic area, the types of sensors including an air temperature sensor, relative humidity sensor, dewpoint sensor, soil moisture sensor, soil temperature sensor, average wind speed sensor, maximum wind speed sensor, and a rainfall sensor, producing a feature vector including a time series of values corresponding to the received sensor data, and using a neural network, estimating the physical characteristics, the physical characteristics including at least one of (a) a leaf wetness, (b) a solar radiation, (c) an evapotranspiration, (d) a future soil moisture, and (e) a future soil temperature.

BRIEF DESCRIPTION OF DRAWINGS

FIG. 2 illustrates, by way of example, a block diagram of an embodiment of a system that is a portion of the system of FIG. 1.

DETAILED DESCRIPTION

Figure 1:
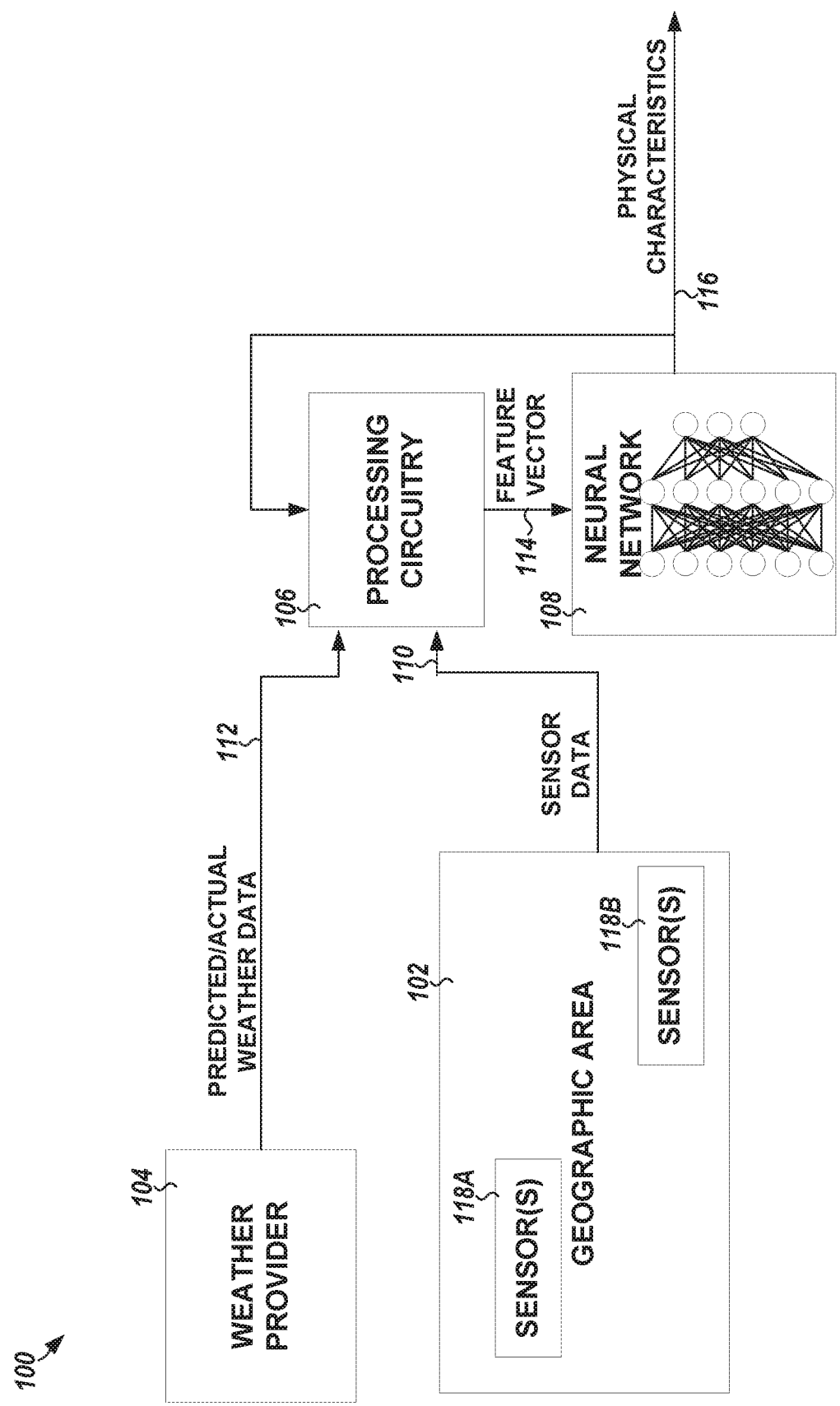
FIG. 1 illustrates, by way of example, a block diagram of an embodiment of a system for microclimate prediction.

In the following description, reference is made to the accompanying drawings that form a part hereof and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

Microclimate Prediction

In optimizing operation of a farm, a geographical region on which a crop is grown or an animal is raised, knowledge of the land composition or climate may be helpful. For example, a farmer may be informed regarding whether to water their crop based on soil moisture content or leaf wetness. In another example, a farmer may be informed regarding whether to plant based on soil temperature.

To this end, many farms are logically split into a uniform grid of cells. Each cell may then be equipped with one or more sensors to monitor the climate or land composition. This solution, however, is quite cost prohibitive and likely includes sensors that provide redundant information. The cost is high due to the large number of sensors needed, one sensor of each type in each cell of the grid, and the infrastructure to receive the information from the sensors. The redundant information may be from cells with similar land composition and climate attributes providing similar or the same sensor data readings.

To help reduce the number of sensors or an amount of unnecessary data, the geographical region may be split into a non-uniform grid of cells based on one or more attributes of the climate or land composition of the geographical region. The non-uniform grid may be used to determine where sensors may be situated, such as without foregoing any sensor data. For example, a first portion of a farm may have a different foliage profile than a second portion of the farm. Those portions may be equipped with different instances of the same sensor, such as to monitor the climate or land composition. Such sensor distribution is described in more detail below.

As previously discussed, sensor data may be important to understanding the characteristics of a farm. However, determining some important characteristics by current techniques may be cost prohibitive. This is because the current techniques require expensive sensors in terms of monetary cost and computation. These important characteristics may include one or more of solar radiation, leaf wetness, evapotranspiration, soil moisture, or soil temperature.

Embodiments herein may use deep learning to predict these physical characteristics using less expensive sensors in a geographical region. Some embodiments may forecast future values for some physical characteristics. These future values may give a farmer insight into what is currently happening on the farm, but also what to expect in the future. The farmer may then use this data to inform actions to be taken on the farm, such as watering, planting, harvesting, fertilizing, spraying, or the like.

Previous models that make predictions of leaf wetness, solar radiation, or evapotranspiration require a large feature space on which the predictions are made. These larger feature spaces often include physical models based on slope, aspect, bulk density of the soil, soil type, depth to a restricting layer, or the like. This feature space will often include data from expensive sensors or it is prohibitively cumbersome to collect all the data required to operate in this feature space. This expense and larger feature space is blocking widespread implementation of these models. Embodiments herein may provide similar results with less expensive sensors or less data. Reference will now be made to the FIGS. to describe further details of embodiments.

FIG. 1 illustrates, by way of example, a block diagram of an embodiment of a system 100 for microclimate prediction. As used herein, microclimate means weather or physical characteristics for a geographical region, such as a farm. It is a microclimate prediction because it is a prediction for the climate only near the sensor(s) and other areas of the geographical region for which the retrieved sensor data is the same or similar. The system 100 as illustrated includes a geographic area 102, a weather provider 104, processing circuitry 106, and a neural network 108 (NN). The geographic area 102 may include a farm or other region for which the microclimate prediction is desired. The geographic area 102 includes sensors 118A-118B situated therein.

The sensors 118A-118B may monitor one or more of air temperature, relative humidity, dewpoint, soil moisture, soil temperature, solar radiation, leaf wetness, wind (average or gust speed), or rainfall. Air temperature and relative humidity may be measured by a digital thermometer and relative humidity probe, respectively. These two sensors are often housed in a single device. Capacitive or resistive sensing may be used for either of the temperature or humidity sensing. Dewpoint is related to the relative humidity and the temperature and may be measured using a hygrometer or calculated based on the air temperature and relative humidity.

Soil moisture may be determined by measuring tension, resistivity, specific gravity, heat diffusion, absorption, penetration, radioactivity or the like. Soil moisture may be estimated based on a dielectric constant or resistivity of the soil. Some example sensors for measuring soil moisture include a tensiometer, hygrometer, or the like. Soil temperature may be measured using a thermometer. Soil temperature may be measured at one or more depths in the soil, such as at one inch (1"), 2", 3", 4", 5", 6", 7", 8", a greater depth or some depth therebetween, etc.

Wind may be measured using an anemometer or vane. A vane may help determine windspeed based on a rate at which a fan-type blade rotates in response to wind incident thereon. An anemometer may help determine windspeed based on an electricity produced by a piezometer compressed in response to wind incident thereon. One or more of a maximum wind speed in a specified time window (e.g., wind gust) and an average wind speed value over a specified time wind (e.g., average wind speed) may be used.

Rainfall may be measured using a standard rain gauge, a pluviometer, a weighing precipitation gauge, a tipping bucket rain gauge, an optical rain gauge, an acoustic rain gauge, or the like. Generally, an average volume of rain may be determined based on a sensed volume, force, weight, optical characteristic, or acoustic characteristic of captured rain.

Solar radiation may be measured using a pyranometer, a quantum sensor (a sensory that measures photon flux density), radiometer, or pyrheliometer, among others. These sensors generally attempt to quantify an amount of shortwave or long-wave radiation incident thereon by different means. Leaf wetness may be measured using a sensor with a synthetic surface that is designed to imitate a surface of foliage nearby. The sensor may then determine an amount of wetness on the surface thereof by quantifying electrical resistance at the surface (a wetter surface has less resistance).

Sensors 118A-118B produce sensor data 110, such as data indicative of the air temperature, relative humidity, dewpoint, soil moisture, soil temperature, solar radiation, leaf wetness, wind (average or gust speed), or rainfall previously discussed. The sensor data 110 may be used as features in a feature vector 114, such as with or without transformation.

The weather provider 104 may include a weather station within a specified distance of the geographic area 102. The specified distance may include twenty-five miles, fifty miles, one hundred miles, less distance, more distance, or a distance therebetween. The weather provider 104 in one or more embodiments, may include a web service (e.g., weather.com, wunderground.com, etc.) that provides predicted or actual weather data 112. The predicted or actual weather data may include, for a specified time, precipitation, wind (gust or average), air temperature, barometric pressure, cloud cover, humidity, or the like.

The processing circuitry 106 may receive the predicted/actual weather data 112 or the sensor data 110. The processing circuitry 106 may produce a feature vector 114 based on the received data. The feature vector 114 may include the sensor data 110 or the predicted/actual weather data 112 or one or more of those values converted to a value operable by the NN 108.

The processing circuitry 204 may include electrical or electronic components configured to perform operations of determining where to situate a sensor in the geographic area 102. The processing circuitry 204 may include a hardware processor, such as may include a central processing unit (CPU), a graphics processing unit (GPU), an application specific integrated circuit (ASIC), field programmable gate array (FPGA), circuitry, such as one or more transistors, resistors, capacitors, inductors, diodes, logic gates (e.g., AND, OR, XOR, or negate), multiplexers, oscillators, buffers, modulators, regulators, amplifiers, demodulators, or the like.

The neural network 108 may include a convolutional NN (CNN), a recurrent NN (RNN), or the like. A convolutional NN includes an input layer, one or more hidden layers, and an output layer. The hidden layers of a CNN may include one or more convolutional layers, pooling layers, fully connected layers or normalization layers. Convolutional layers apply a convolution (more accurately, in mathematical terms, a cross-correlation) operation to an input thereto, passing a result to a next layer.

The convolution brings a solution that reduces the number of free parameters, allowing the network to have more layers with fewer parameters. For example, regardless of image size, tiling regions of size 5×5, each with the same shared weights, requires only 25 learnable parameters. In this way, convolution resolves a vanishing or exploding gradient problem that is realized in training traditional multi-layer neural networks with many layers. The NN can be trained using input-output examples that include time series values of the sensor data and known values of the physical characteristics.

As previously discussed, a CNN may include one or more pooling layers (e.g., global or local pooling layers), which combine the outputs of neuron clusters at one layer into a single input to a neuron in the next layer. For example, a pooling layer may use a maximum value or an average value from a cluster of neurons at a previous layer. A fully connected layer may connect every neuron in one layer to every neuron in another layer. CNNs share weights in convolutional layers, which means that the same filter (weights bank) is used for each receptive field in the layer; this reduces memory footprint and improves performance.

An RNN includes nodes with a directed (one-way) connection to every other node. A node may have a time-varying real-valued activation value. Each connection has a modifiable real-valued weight. Nodes are either input nodes, output nodes, or hidden nodes, similar to a CNN.

CNN take a fixed size input and generate fixed-size outputs. CNN is a type of feed-forward artificial neural network—are variations of multilayer perceptrons which are designed to use minimal amounts of preprocessing. CNNs use connectivity pattern between its neurons is inspired by the organization of the animal visual cortex, whose individual neurons are arranged in such a way that they respond to overlapping regions tiling the visual field.

An RNN in contrast may handle arbitrary input/output lengths. RNN, unlike CNN, may use an internal memory to process arbitrary sequences of inputs. RNNs may exploit time-series information. For example, a prior physical characteristic value may be corelated to a next physical characteristic value.

An example node of an RNN include a long short-term memory (LSTM) structure. A common LSTM unit is composed of a cell, input, output, and forget gate. The cell remembers values over arbitrary time intervals. Each of the three gates compute an activation (using an activation function) of a weighted sum. There may be connections between these gates and the cell.

The expression long short-term refers to LSTM as a model for the short-term memory, which may last for a relatively long time. An LSTM may classify, process and predict time series data, given time lags of unknown size and duration between important events. LSTMs deal with the exploding and vanishing gradient problem when training traditional RNNs. Relative insensitivity to time gap length between input gives an advantage to LSTM over alternative RNNs, hidden Markov models and other sequence learning methods.

The neural network (NN) 108 receives the feature vector 114 and generates data indicating current, past, or future physical characteristic values 116. For example, the NN 108 may determine, based on the feature vector 114, a past, current, or future solar radiation total, leaf wetness, soil moisture, soil temperature, or reference evapotranspiration.

Solar radiation total is a sum of solar intensity incident on a specified area of Earth's surface within a specified time. Solar radiation is influenced by latitude and longitude of the geographical region, atmospheric conditions, and obstructions, such as buildings or flora, among others. The NN 108, given the feature vector 114, may predict a current, past, or future solar radiation.

The leaf wetness indicates an amount of dew or other precipitation left on a surface. Leaf wetness may be used to help control an irrigation system, detect fog or dew conditions, or early detection of rainfall. The NN 108, given the feature vector 114, may predict a current, past, or future leaf wetness.

Evapotranspiration indicates a rate at which moisture is transferred from land to the atmosphere, such as by evaporation from soil, waterbodies, or other surfaces or transpiration from flora. Transpiration accounts for movement of water within flora and loss of water as vapor. Evapotranspiration may be determined based on a reference surface (e.g., grass or alfalfa, among others) at a weather station. Types of vegetation and land use significantly affect evapotranspiration. Thus, an evapotranspiration determined at a weather station is likely not accurate for a farm, even a nearby farm.

Other methods of determining evapotranspiration include catchment water balance calculations, energy balance calculations, Blaney-Criddle equation, Makkink, Hargreaves, and the Penman or Penman-Monteith equation. A sensor to determine evapotranspiration may include a weighing lysimeter. Using the lysimeter, evapotranspiration may be determined based on a change in weight and an amount of rainfall. Unlike these approaches, the NN 108, given the feature vector 114, may predict a current, past, or future evapotranspiration.

Additionally, or alternatively, the NN 108 may further predict future soil moisture or soil temperature values. The soil temperature values may be for one or more depths in the soil.

Figure 2:
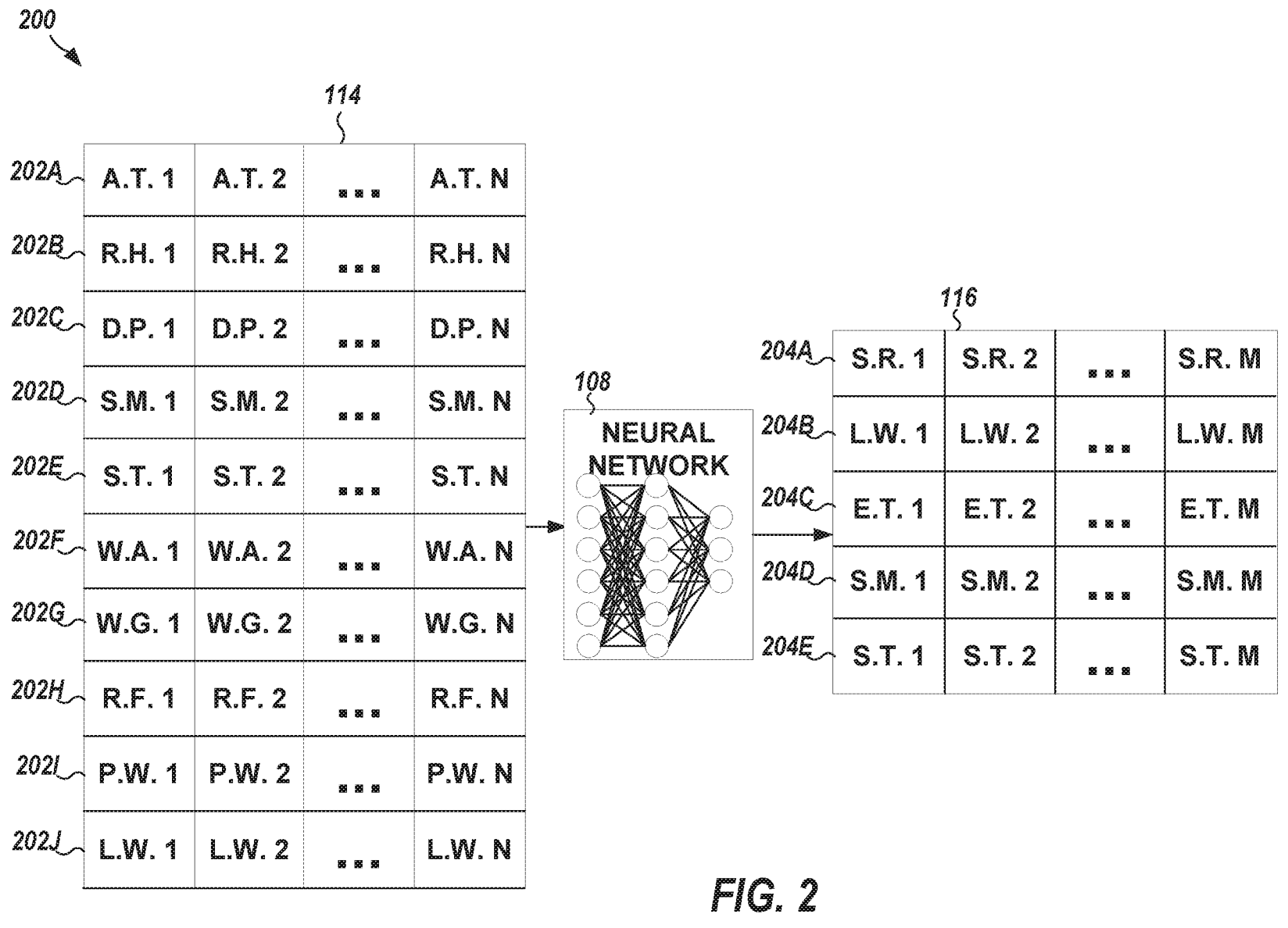

FIG. 2 illustrates, by way of example, a block diagram of an embodiment of a system 200 that is a portion of the system 100 of FIG. 1. The system 200 as illustrated includes an exploded view of the feature vector 114 and the physical characteristics 116. The feature vector 114 as illustrated includes features 202A, 202B, 202C, 202D, 202E, 202F, 202G, 202H, and 202I at various times (e.g., "X.Y. 1" corresponds to feature "X.Y." at a first time and "X.Y. 2" corresponds to feature "X.Y." at a second time).

The feature 202A corresponds to air temperature (A.T.), feature 202B corresponds to relative humidity (R.H.), feature 202C corresponds to dewpoint (D.P.), feature 202D corresponds to soil moisture (S.M.), feature 202E corresponds to soil temperature (S.T.), feature 202F corresponds to wind average (W.A.), feature 202G corresponds to wind gust (W.G.), feature 202H corresponds to rainfall (R.F.), feature 202I corresponds to predicted weather (P.M.), and feature 202J corresponds to leaf wetness (L.W.). All, or just a subset, of the features 202A-202J may be used by the NN 108 to produce the physical characteristics 116. For example, in determining a current or past solar radiation (S.R.), leaf wetness, or evapotranspiration (E.T.), the features 202A-202I may be used. In another example, in determining a future L.W., S.M., or S.T. all, or a subset, of the features 202A-202G and 202J may be used as input.

The NN 108, as previously discussed, may include one or more NN layers. The NN 108 may include one or more encode layers. The NN 108 may include one or more classification layers. The NN 108 may be trained based on historical A.T., R.H., D.P., S.M., S.T., W.A., W.G., R.F., or the like, data for which there is known S.R., L.E., or E.T. data. For training the NN 108 to predict future values, historical data with known future S.M., S.T., or L.W. data.

Parameter (weight) tuning for the NN 108 may be done in a variety of ways. Manual selection, random search, grid search, or Bayesian optimization are a few popular ways. Manual search includes human alteration of the parameters based on knowledge of the operation of the NN 108. Using grid search, ranges of values are identified and then combinations of those ranges of values are selected in a structured manner (if increasing/decreasing a parameter results in a more accurate NN, that parameter may again be increased/decreased) and tested to determine which combination operates best. Random search is similar to grid search, except that next parameter selection is random rather than structured. In Bayesian optimization, Bayes' theorem is exploited to reduce an amount of time it takes for the selected parameters to converge.

The output 204A, 204B, 204C, 204D, and 204E may include estimations of physical characteristics of the geographic area 102. The estimations may be for a future, past, or a current time. The output 204A-204E may include at least one of S.R., L.W., E.T., S.M., or S.T. The output 204A-204E may be used as input for determining a future value of the output 204A-204E. That is, the output from the NN 108 may be used as part of the feature vector 114 in determining future or another value for the output 204A-204E.

Figure 3:
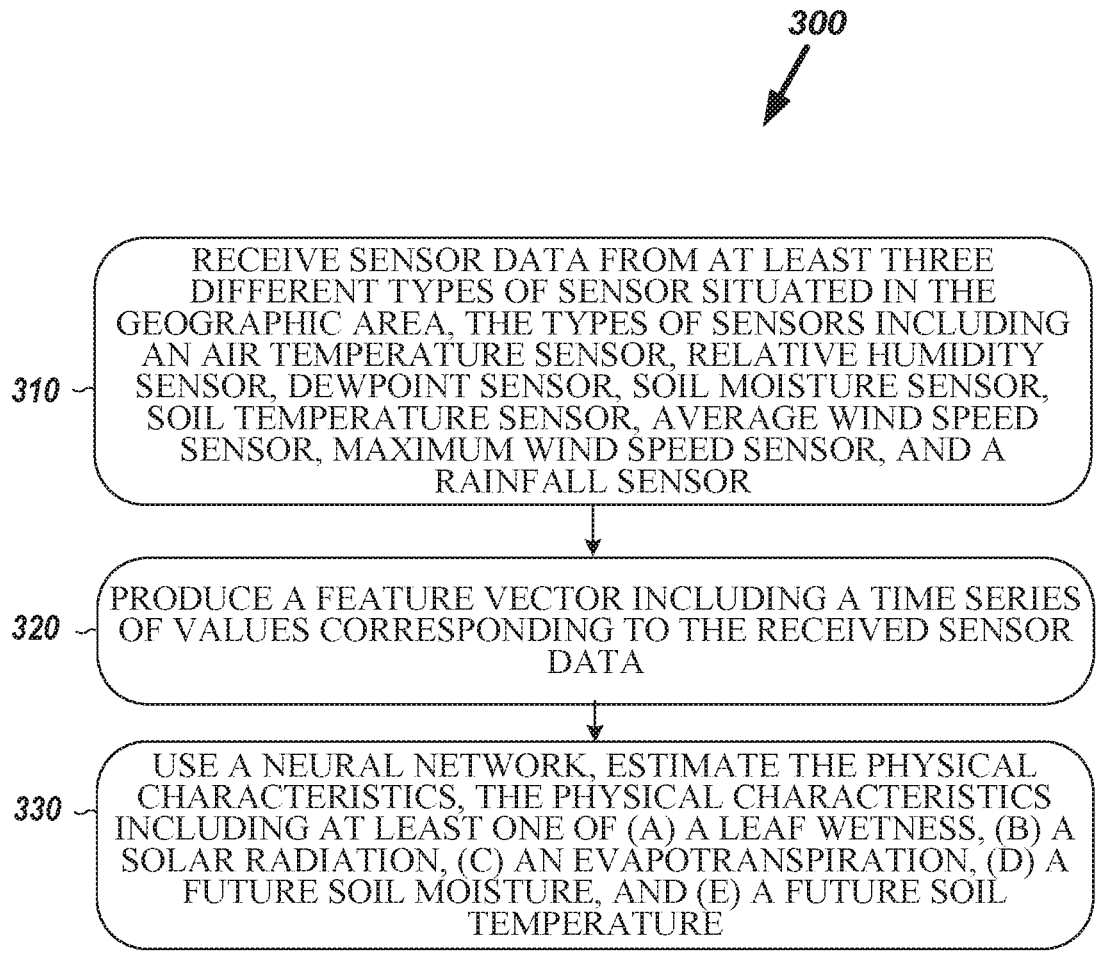
FIG. 3 illustrates, by way of example, an embodiment of a method for determining physical characteristics of a geographic area.

FIG. 3 illustrates, by way of example, an embodiment of a method 300 for determining physical characteristics of a geographic area. The method 300 as illustrated includes receiving sensor data from at least three different types of sensor situated in the geographic area, the types of sensors including an air temperature sensor, relative humidity sensor, dewpoint sensor, soil moisture sensor, soil temperature sensor, average wind speed sensor, maximum wind speed sensor, and a rainfall sensor, at operation 310; producing a feature vector including a time series of values corresponding to the received sensor data, at operation 320; and using a neural network, estimating the physical characteristics, the physical characteristics including at least one of (a) a leaf wetness, (b) a solar radiation, (c) an evapotranspiration, (d) a future soil moisture, and (e) a future soil temperature, at operation 330.

The method 300 can further include receiving past or predicted weather data from a weather provider including one of (a) a physical weather station within a specified distance from the geographical region and (b) a web service that provides past weather data and a weather forecast. The method 300 can further include including a time series of values corresponding to the weather data as part of the feature vector. The method 300 can further include, wherein the physical characteristics include current solar radiation, leaf wetness, and evapotranspiration.

The method 300 can further include using a value corresponding to an estimated leaf wetness as part of the feature vector, and estimating a future value for at least one of (a) the leaf wetness, (b) soil moisture, and (c) soil temperature based on the feature vector. The method 300 can further include, wherein the sensor data includes at least three of air temperature, relative humidity, dewpoint, soil moisture, soil temperature, average wind speed, maximum wind speed, and rainfall.

The method 300 can further include, wherein the physical characteristics include current solar radiation, leaf wetness, and evapotranspiration. The method 300 can further include, wherein the neural network is a convolutional neural network or a recurrent neural network. The method 300 can further include generating a microclimate map based on the estimated physical characteristics, the microclimate map including the estimated physical characteristics at locations corresponding to locations of the sensors in the geographical area and values for the physical characteristics interpolated between the locations of the sensors.

Sensor Placement

In optimizing operation of a farm, a geographical region on which a crop is grown or an animal is raised, knowledge of the land composition or climate may be helpful. To this end, many farms are logically split into a uniform grid of cells. Each cell is then equipped with one or more sensors to monitor the climate or land composition. This solution, however, is quite cost prohibitive and likely includes sensors that provide redundant information. The cost is high due to the large number of sensors needed, one sensor of each type in each cell of the grid, and the infrastructure to receive the information from the sensors. The redundant information may be from cells with similar land composition and climate attributes providing similar or the same sensor data readings.

An advantage of embodiments may include reducing a number of sensors or an amount of unnecessary (e.g., redundant) data from the sensors. To help reduce the number of sensors or an amount of unnecessary data, the geographical region may be split into a non-uniform grid of cells based on one or more attributes of the climate or land composition of the geographical region. The non-uniform grid may be used to determine where sensors may be situated, such as without foregoing any sensor data. For example, a first portion of a farm may have a different foliage profile than a second portion of the farm. Those portions may be equipped with different instances of the same sensor, such as to monitor the climate or land composition.

Consider further, a third portion of the farm that is non-contiguous with the first portion, but includes a similar foliage profile as the first portion. The data from the sensor in the first portion may be assumed to be valid for the third portion. In such a manner, the number of sensors used and data received from the sensors may be reduced.

In some embodiments, multiple types of sensors are to be deployed in the geographical region, such as to monitor respective attributes. The attribute monitored by a first sensor may have a different corresponding attribute map than another attribute monitored by a second sensor. In such an example, the attribute maps may be registered to each other or the geographical region and overlaid on each other. Sensors for both the attributes may be situated in regions corresponding to locations where the heterogeneous regions of the attribute maps overlap. In this manner, the number of electrical power devices required to power the sensors and an amount network communication infrastructure may be reduced relative to other solutions.

Reference will now be made to the FIGS. to describe further details of embodiments.

Figure 4:
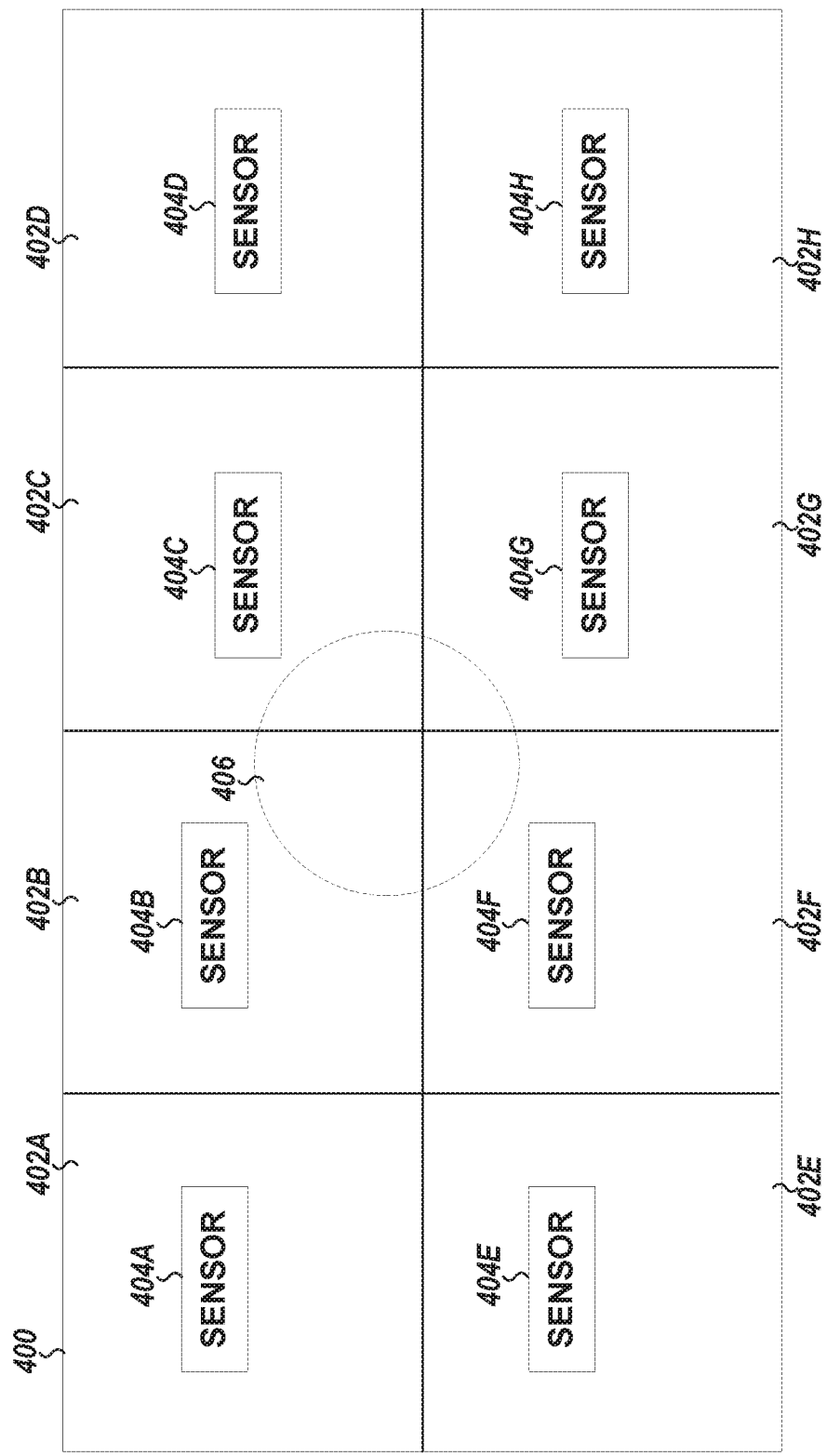
FIG. 4 illustrates, by way of example, a diagram of an embodiment of sensors situated in respective cells of a geographical region.

FIG. 4 illustrates, by way of example, a diagram of an embodiment of sensors 404A, 404B, 404C, 404D, 404E, 404F, 404G, and 404H situated in respective cells 402A, 402B, 402C, 402D, 402E, 402F, 402G, and 402H of a geographical region 400. The geographical region 400 is split into a uniform grid of cells 402A-402H. For each cell 402A-402H there are one or more sensors 404A-404H situated therein. Some drawbacks to situating sensors 404A-404H in each cell of a uniform grid include the cost and number of the sensors 404A-404H, the cost and amount of electrical components required to provide power to the sensors 404A-404H and manage data from the sensors 404A-404H, the amount of data being received from the sensors 404A-404H, and the amount of redundant data that is received from the sensors 404A-404H, and that there may be sub-regions within the grid of cells that have a unique climate or land composition attribute that is not being monitored.

Consider the sub-region corresponding to the dashed line 406 and assume that this region has an attribute that is unique in the geographical region 400. There are no sensors deployed in this region, thus no data is considered regarding unique a unique characteristic of this region (unique relative to a remainder of the geographical region 400. Thus, the uniform grid of cells 402A-402H may be insufficient to account for all the diversity in the geographical region 400.

Figure 5:
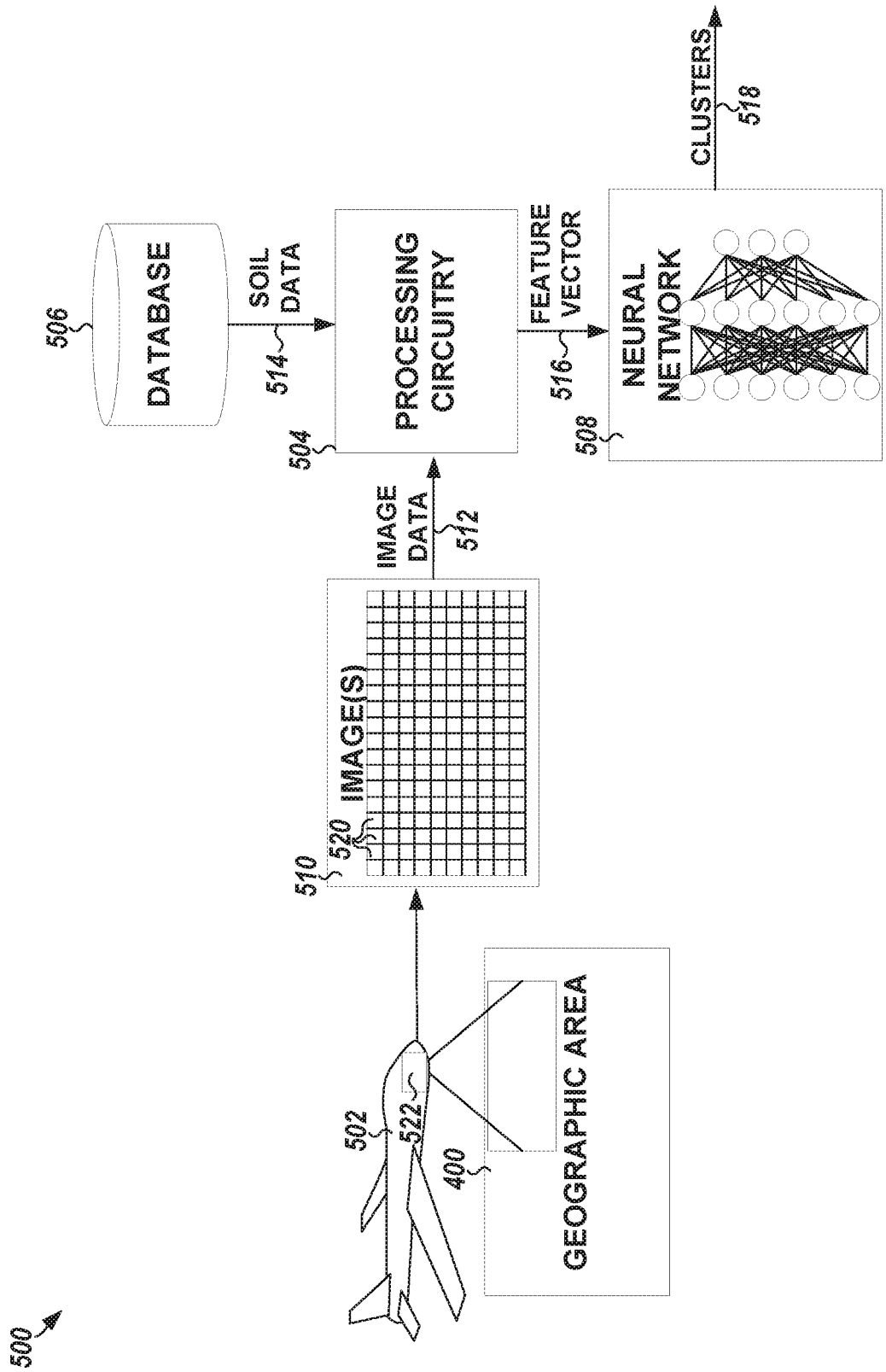
FIG. 5 illustrates, by way of example, a diagram of an embodiment of a system for determining sensor deployment location for the geographic area.

FIG. 5 illustrates, by way of example, a diagram of an embodiment of a system 500 for determining sensor deployment location for the geographic area 400. The system 500 may overcome one or more of the problems discussed regarding deploying sensors based on the uniform grid of cells of FIG. 4. The system 500 as illustrated includes an aerial vehicle 502, processing circuitry 504, a database 506, and a clustering circuitry 508.

The aerial vehicle 502 includes an imaging device 520 that captures one or more images of the geographic area 400. The aerial vehicle 502 may include an autonomous or manned aerial vehicle. The aerial vehicle 502 may include a drone, airplane, balloon, satellite, power glider, or the like. In some embodiments, the aerial vehicle 502 is not needed. Instead of using the aerial vehicle 502 to produce an image, an image may be produced by a user on the ground or another structure, such as a tower or building. The location on the ground, tower, or building may provide a vantage point at which the geographic area 400 may be within a field of view of the camera 522.

The aerial vehicle 502 may include an imaging device 520 that produces an image 510 of the geographic area 400. The image 510 may be a spectral image, such as may include data indicative of a visible color, black and white, infrared, ultraviolet, multi-spectral, or other image. The image 510 may be of the geographical region 400. Image data 512 representative of the image 510 may be provided to the processing circuitry 504.

The database 506 includes soil data 514 stored thereon. The soil data 514 may include physical soil characteristics. The physical soil characteristics may include soil texture (relative proportions of particles of various sizes, such as sand, silt, and clay in the soil), soil structure (arrangement of the particles of the soil), consistence (resistance of soil to deformation or rupture), particle density (mass per unit volume of soil particles—does not include pores), bulk density (mass of soil per unit volume of soil—includes pores), pore space (percent pore space may be determined based on the bulk density and particle density), Atterberg limits (moisture content at which a soil changes from plastic consistence to liquid consistence or vice versa), color, permeability (ability of soil to transmit water and air), or the like.

The database 506 may be local to (on a same network) or remote from (on a different network) the processing circuitry. For example, the soil data 514 may be manually determined by sampling the soil at the geographical location 400 or retrieved from a repository of soil data, such as may be available from the United States Department of Agriculture, or the like.

The processing circuitry 504 may include electrical or electronic components configured to perform operations of determining where to situate a sensor in the geographical region 400. The processing circuitry 504 may include a hardware processor, such as may include a central processing unit (CPU), a graphics processing unit (GPU), an application specific integrated circuit (ASIC), field programmable gate array (FPGA), circuitry, such as one or more transistors, resistors, capacitors, inductors, diodes, logic gates (e.g., AND, OR, XOR, or negate), multiplexers, oscillators, buffers, modulators, regulators, amplifiers, demodulators, or the like.

The processing circuitry 504 may receive the image data 512 and the soil data 514 and create a feature vector 516 based on the image data 512 and the soil data 514. A characteristic of the geographical region corresponding to the image data 512 may be inferred from the image data 512. For example, the characteristic may include soil moisture (e.g., as determined by a sensor), soil temperature (e.g., as determined by a sensory), soil organic carbon (percentage of soil organic matter in a top region of soil), leaf area index (LAI), plant "greenness" index, soil moisture, pH, land surface temperature (LST), or the like of the imaged geographical region.

Soil organic carbon has been shown to correlate with a Euclidean distance along a soil line. To determine soil organic carbon, sometimes called perpendicular vegetation index (PVI), Equations 1 and 2 may be used.

$$NIR_{790} = \beta_1 R_{660} + \beta_0 \text{ (soil line)} \quad \text{Equation 1}$$

$$PVI = \frac{1}{\sqrt{\beta_1^2 + 1}} (NIR_{790} - \beta_1 R_{660} - \beta_0) \quad \text{Equation 2}$$

In Equations 1 and 2, $\beta_1$=slope of soil line, $\beta_0$=intercept of soil line, NIR is near infrared image data. LAI may be determined based on Equation 3.

$$MTVI2 = \frac{1.5[1.2*(NIR_{800} - G_{550}) - 2.5*(R_{670} - G_{550})]}{\sqrt{(2*NIR_{800} + 1)^2 - (6*NIR_{800} - 5\sqrt{R_{670}} - 0.5}} \quad \text{Equation 3}$$

In Equation 3 G is a green/yellow color intensity in an image and R is a red color intensity in the image. Plant greenness may be determined using Equation 4.

$$NDRE = \frac{NIR_{790} - RE_{735}}{NIR_{790} + RE_{735}} \qquad \text{Equation 4}$$

In Equation 4, NDRE is a normalized difference red edge index.

Soil moisture, pH, and land surface temperature may be determined using an NDVI index. The NDVI index may be determined using Equation 5.

$$NDVI = \frac{NIR_{790} - R_{660}}{NIR_{790} + R_{660}}$$

With labeled data, many of the parameters of interest may be calculated with NDVI, but there are many indexes that may be used that target specific parameters, (e.g., Modified Triangular Vegetation Index—Improved (MTVI2) for LAI or (PVI) for organic carbon content etc.). The subscript in the equations above refer to the wavelength centers for that particular spectral band. The wavelength centers may vary slightly without affecting data quality. For example, whether NIR is centered at 800 nanometers or 790 nanometers, the data quality is generally not different.

The image data 512 and the soil data 514 may be partitioned by cell 522 in a uniform grid of cells. The size of each cell 522 may be smaller than the size of each cell 402A-402H. This smaller cell size may help guarantee that portions of the geographic area 400 with unique attributes include data in the image data 512 and the soil data 514. This helps the system 500 determine efficient sensor placement within the cells 522.

The processing circuitry 504 may determine, for each cell 522, an average and standard deviation for each attribute to consider. The attribute may include one or more spectral values from the image data 512 or one of the soil physical characteristics. Note that different image data may be used for different attributes and used to create respective attribute maps. The processing circuitry 504 may determine the feature vector 516 based on the average and standard deviation values. The feature vector 516 may include a covariance matrix or similarity matrix that includes at least one entry for each cell of the cells 520. The covariance matrix or similarity matrix may be produced using a radial basis function kernel. The values for each cell 522 may be in its own row in the feature vector 516. The average and standard deviation of the image data 512 may be in respective columns of the feature vector 516. The average and standard of the soil data 514 may be in other respective columns of the feature vector 516, and so on. If there are 64 grid cells 522, then there may be, for example, 64 rows in the feature vector 516.

Example feature vectors for a first attribute and a second attribute are provided below. The differences between the feature vectors are in the first column.

| $i1_1$ | $s1_1$ | $s2_1$ | ... |
| $i1_2$ | $s1_2$ | $s2_2$ | ... |
| $i1_3$ | $s1_3$ | $s2_3$ | ... |
| . | . | . | |
| . | . | . | |
| . | . | . | |

Feature Vector for First Attribute

| $i2_1$ | $s1_1$ | $s2_1$ | ... |
| $i2_2$ | $s1_2$ | $s2_2$ | ... |
| $i2_3$ | $s1_3$ | $s2_3$ | ... |
| . | . | . | |
| . | . | . | |
| . | . | . | |

Feature Vector for Second Attribute

In the feature vectors $im_j$ represents an average of the image data, i, in cell j of the image of attribute m, and $sp_j$ represents soil data, s, of soil of cell j corresponding to soil physical characteristic p.

The feature vector 516 may be provided as input to the radial basis function using the processing circuitry 504. A radial basis function is a real valued function whose value depends on a distance from another point (called a center). The distance may be a Euclidean distance or other distance. The radial basis function may be used as a kernel in vector classification, such as in embodiments herein. An example of a Gaussian radial basis function kernel is provided in Equation 1 where $x_i$ is a row of the feature vector 516 and $x_j$ is another row of the feature vector 516, and $\sigma \in [0,1]$ is a tuning parameter. In some embodiments, a value of $\sigma > 0.90$ provides better sensor placement results.

$$q(x_i, x_j) = \exp(|x_i - x_j|^2 / 2\sigma^2) \qquad \text{Equation 1}$$

q is a square matrix with dimensions N×N, where N is the number of rows of the feature vector 516. Each entry in q is a number $\in [0,1]$ that indicates an amount of similarity between two rows. The higher the number, the more similar the rows, and corresponding cell attributes. Each entry in the diagonal of k equals one (1). Other entries in q indicate similarity between attributes of the corresponding cells. For example, a fourth entry in the second row of q indicates the similarity between attributes of the second and fourth cells of the cells 522.

The clustering circuitry 508 may segregate entries of the q matrix into respective clusters 518. The number of clusters may be configurable, such as may be based on the number of sensors available for an attribute, a size of the geographical region 400, a number of power sources available to power the sensors, the network communication circuitry available to receive data from the sensors, a bandwidth of the network communication circuitry, an amount of storage space available to store the data from the sensors, or the like. The clustering circuitry 508 may perform a k-means clustering technique based on the q matrix to create the clusters 518.

A k-means clustering technique partitions n observations (in embodiments N cells) into k clusters. In k-means clustering, each observation is partitioned to the cluster with a nearest mean (sometimes called a cluster center). The k-means clustering technique may be implemented using the clustering circuitry 508, such as may implement an unsupervised machine-learning technique. A sensor may be placed at a location corresponding to each cluster. The data from the sensor corresponding to one of the clusters 518 may be assumed to be the same for other locations in the geographical region 400 corresponding to the same one of the clusters 518. In other words, each cluster consists of a contiguous area within the geographic area having similar values of the attribute or attributes.

Figure 6:
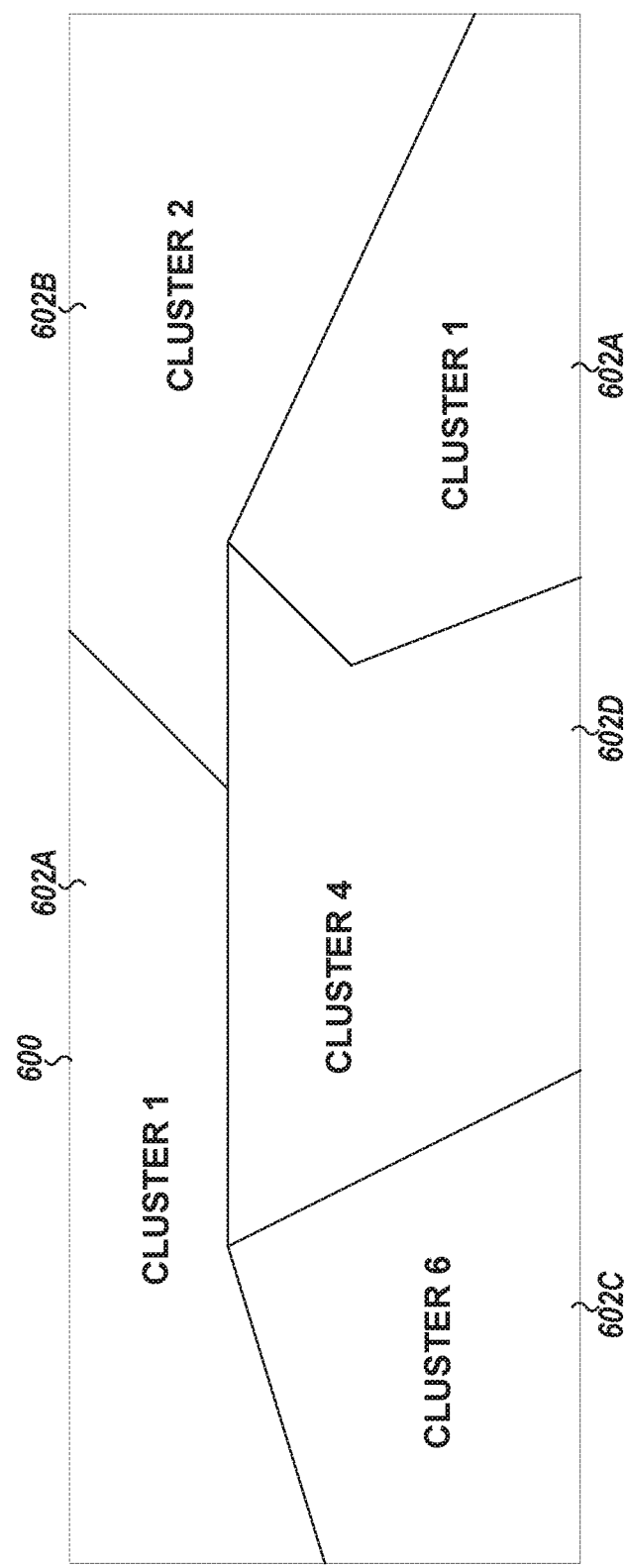
FIG. 6 illustrates, by way of example, a diagram of an embodiment of an attribute map split into regions based on a first attribute.

FIG. 6 illustrates, by way of example, a diagram of an embodiment of an attribute map 600 split into regions based on a first attribute. Instead of logically splitting the geographical region 400 into a uniform grid of cells as in FIG. 4, the attribute map 600 of FIG. 6 is split into heterogeneous areas 602A, 602B, 602C, and 602D based on attributes of the attribute map 600, such as by using the system 500.

The heterogeneous areas 602A-602D may each correspond to a different cluster of the clusters 518. Note that the heterogeneous area 602A-602D need not be contiguous in the attribute map 600. For example, the heterogeneous area 602A includes two regions in the attribute map 600 that do not share a border.

Figure 7:
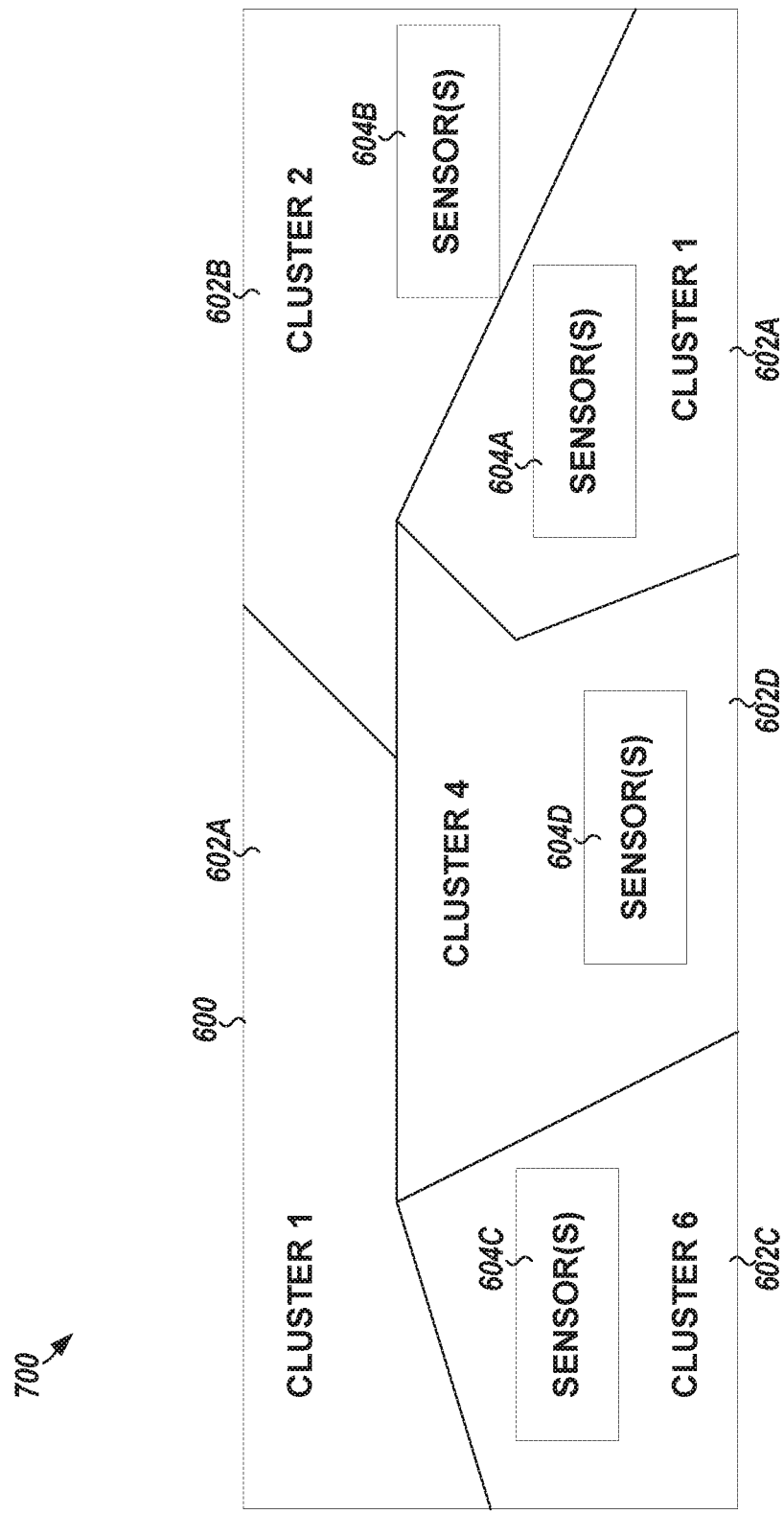
FIG. 7 illustrates, by way of example, a diagram of an embodiment of the attribute map with sensor(s) deployed therein.

FIG. 7 illustrates, by way of example, a diagram of an embodiment of the attribute map 600 with sensor(s) 604A, 604B, 604C, and 604D deployed therein. In the embodiment of FIG. 7, each heterogeneous area 602A-602D (e.g., each cluster) in the attribute map 600 is provided with sensor(s) 604A-604D. The sensors 604A-604D may include soil moisture, soil temperature, leaf wetness, solar radiation, wind, rainfall, humidity, air temperature, or dewpoint sensor, among others. These sensors are described in the Microclimate Prediction section above.

Note that the embodiment of FIG. 7 regards a simple case of placing sensor(s) 604A-604D to monitor a single attribute. In some embodiments, multiple attributes may be monitored. However, each attribute may have a different attribute map. The attribute map 600 represents an attribute map for a first attribute.

One solution to situating sensors based on multiple attributes may include placing a sensor at the center of each cluster of each attribute. That is, an attribute map may be created for each attribute to be monitored. For each cluster produced by the clustering circuitry 508, a sensor may be located within the geographical region corresponding to the cluster. However, such a solution is sub-optimal in terms of amount of communication network circuitry and power supply devices required to manage operation of the sensors.

A more efficient solution may include determining regions of overlap between clusters in a first attribute map and a second attribute map and locating multiple sensors near each other so that they may be powered by the same power circuitry or communicate over the same communication network circuitry.

Figure 8:
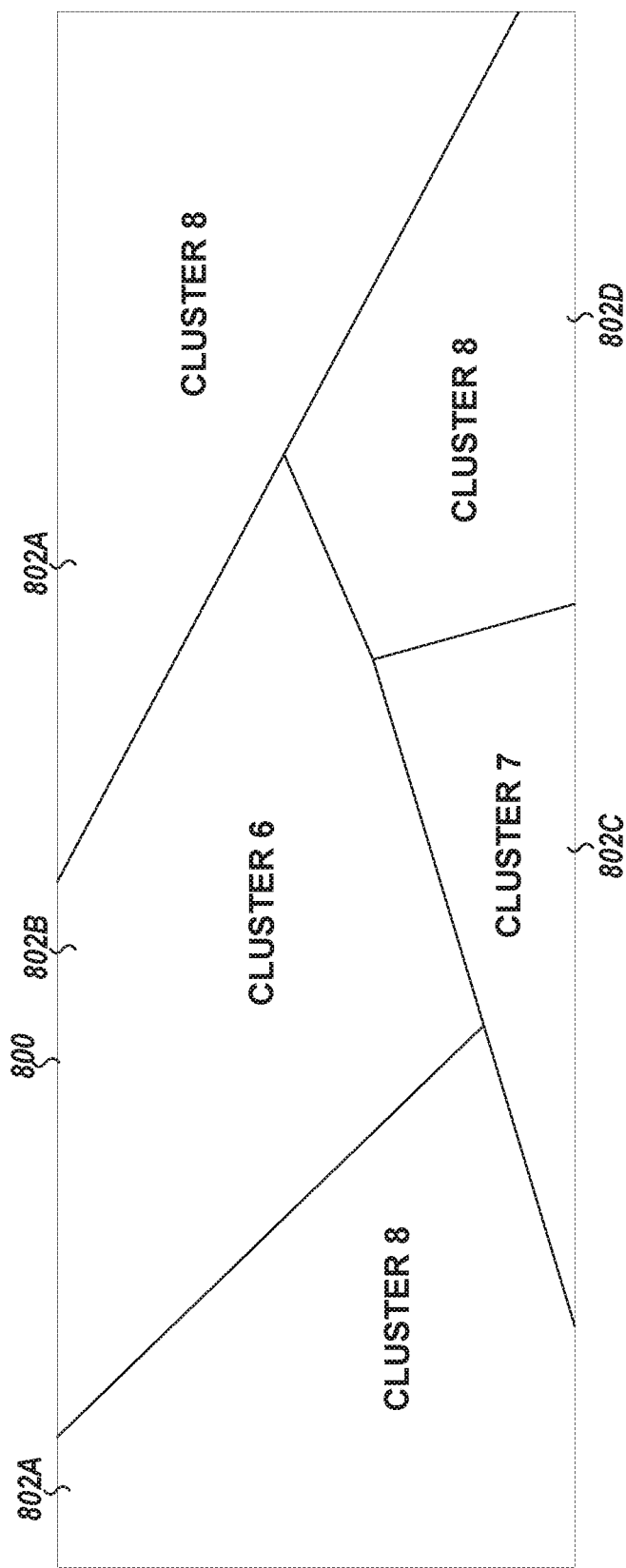
FIG. 8 illustrates, by way of example, a diagram of an embodiment of another attribute map.

FIG. 8 illustrates, by way of example, a diagram of an embodiment of another attribute map 800. The attribute map 800 may be created using the system 500, but using a different attribute than that used for generating the attribute map 600 of FIG. 6. The attribute map 800 as illustrated includes four heterogeneous areas 802A, 802B, 802C, and 802D corresponding to four different clusters of the attribute map 800. Using a different attribute to determine the heterogeneous areas 802A-802D results in a different segmentation as compared to using the attribute corresponding to the attribute map 600.

Figure 9:
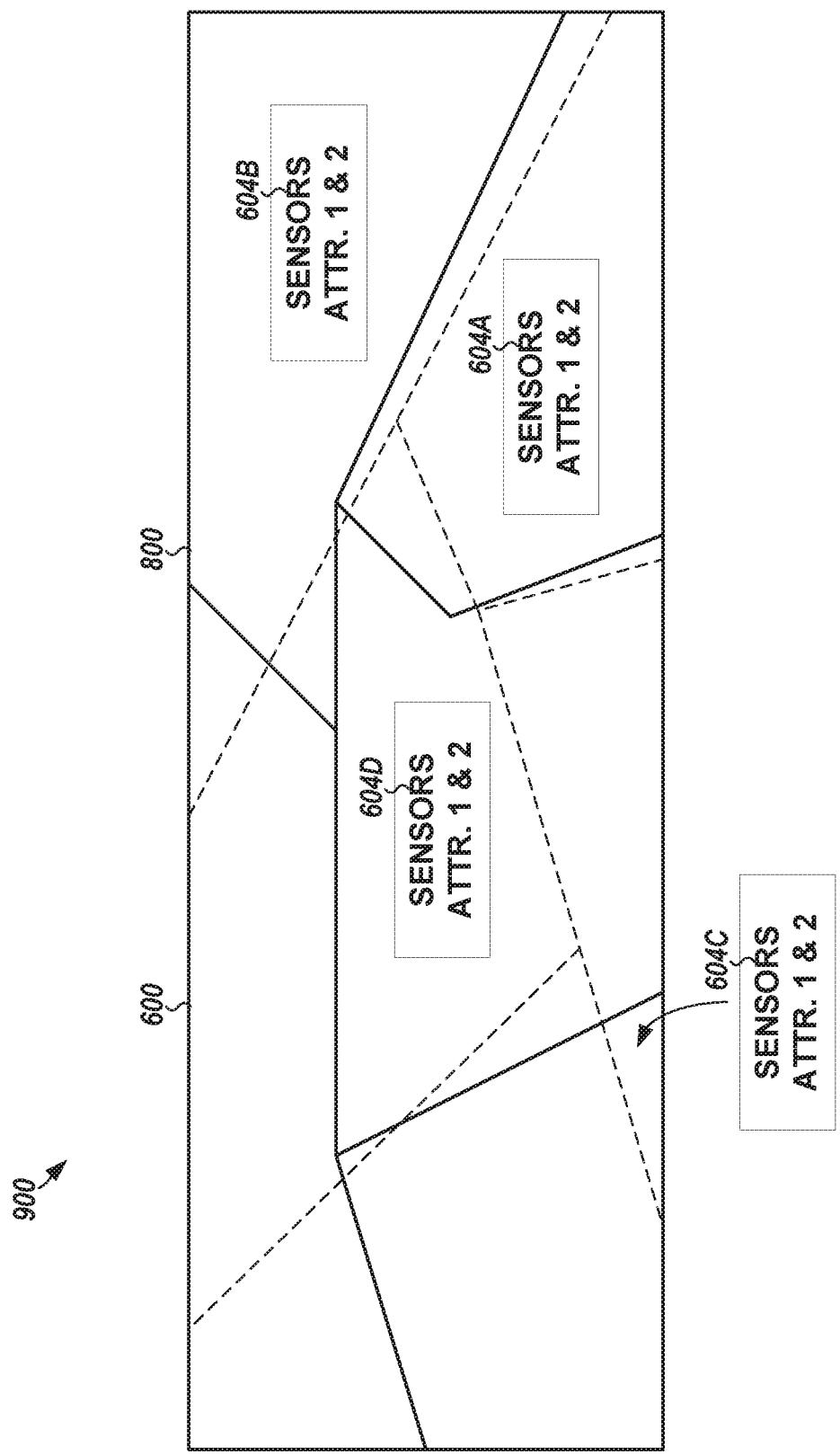
FIG. 9 illustrates, by way of example, a diagram of an embodiment of a combined attribute map that includes the attribute maps of FIGS. 6 and 8 overlaid on each other.

FIG. 9 illustrates, by way of example, a diagram of an embodiment of a combined attribute map 900 that includes the attribute maps 600 and 800 overlaid on each other. Note that in FIGS. 4, 7, and 9 the placement of the sensors illustrated is representative of an actual physical placement within the sub-region. The combined attribute map 900 includes sensors located in each geographical region corresponding to the heterogeneous areas 602A-602D and 802A-802D. Each heterogeneous area 602A-602D and 802A-802D corresponds to the clusters 518 produced for each of the two attribute maps 600 and 800. In this embodiment, only four sensor locations are required to gain information regarding all of the heterogeneous areas 602A-602D and 802A-802D.

The sensors 604A may monitor both attributes of the clusters 1 and 8, the sensors 604B may monitor both attributes of the clusters 2 and 5, the sensors 604D may monitor both attributes of the clusters 4 and 6, and the sensors 604C may monitor both attributes of the clusters 3 and 7. Each of the sensors 604A-604D may include a sensor to monitor the first attribute (e.g., sensor 604A-604D) and a sensor to monitor the second attribute. In this manner, the amount of communication network circuitry or power devices may be retained at or near that required to monitor just one attribute. Note that not all attributes overlap in a manner in which the same number of sensor locations may be used for multiple attributes as may be used for a single attribute. The embodiment illustrated just happens to work out that way.

Figure 10:
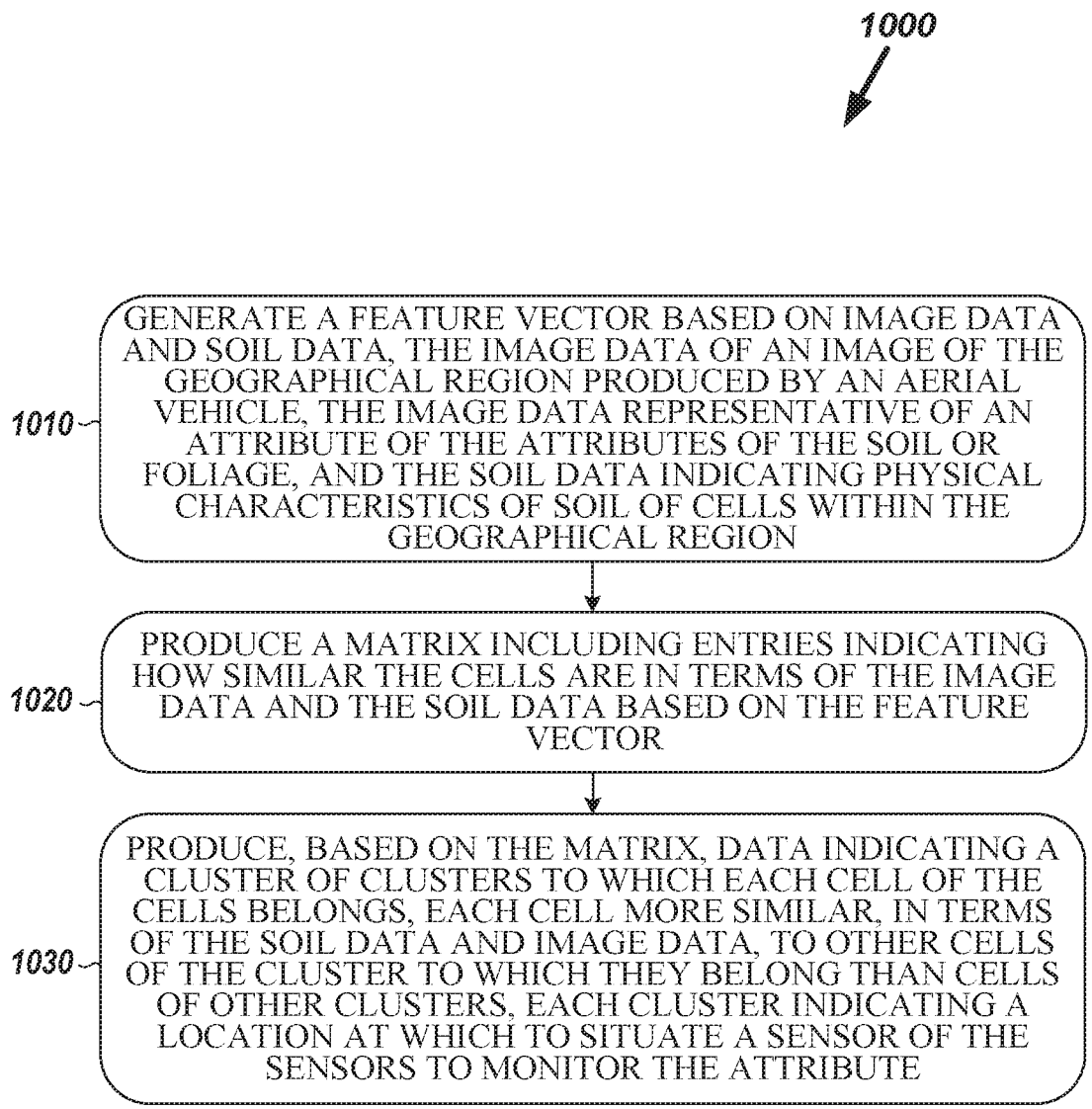
FIG. 10 illustrates, by way of example, a diagram of an embodiment of a method for sensor deployment in a geographical region.

FIG. 10 illustrates, by way of example, a diagram of an embodiment of a method 1000 for sensor deployment in a geographical region. The method 1000 as illustrated includes, generating (e.g., by processing circuitry) a feature vector based on image data and soil data, the image data of an image of the geographical region produced by an aerial vehicle, the image data representative of an attribute of the attributes of the soil or foliage, and the soil data indicating physical characteristics of soil of cells within the geographical region, at operation 1010; producing a matrix including entries indicating how similar the cells are in terms of the image data and the soil data based on the feature vector, at operation 1020; and producing, (e.g., by clustering circuitry) based on the matrix, data indicating a cluster of clusters to which each cell of the cells belongs, each cell more similar, in terms of the soil data and image data, to other cells of the cluster to which they belong than cells of other clusters, each cluster indicating a location at which to situate a sensor of the sensors to monitor the attribute, at operation 1030.

The image data can include one or more of multi-spectral image data and color image data, the attribute includes one of soil moisture and soil temperature, and the physical characteristics of the soil include at least one of soil texture, soil structure, consistence, particle density, bulk density, pore space, color, and permeability. The feature vector can include, for each cell of the cells, an average of the image data corresponding to the cell and soil data corresponding to the cell for one or more of the physical characteristics. The method 1000 can further include, wherein the image data is first image data of a first image and is representative of a first attribute, the feature vector is a first feature vector, the matrix is a first matrix, the data is first data, the cluster and clusters are a first cluster and first clusters, respectively, and the sensor and sensors are a first sensor and first sensors, respectively. The method 1000 can further include receiving second image data of a second image of the geographical region, the second image data representative of a second attribute of the soil or foliage. The method 1000 can further include generating a second feature vector based on the second image data and the soil data. The method 1000 can further include producing a second matrix including entries indicating how similar the cells are in terms of the image data and the soil data. The method 1000 can further include producing second data indicating a second cluster of second clusters to which each cell of the cells belongs, each cell more similar, in terms of the soil data and image data, to other cells of the second cluster to which they belong than cells of other second clusters, each second cluster indicating a location at which to situate a second sensor of second sensors to monitor the second attribute.

The method 1000 can further include comparing the first clusters and the second clusters to determine locations in the geographical region where a cluster of the first cluster overlaps with a cluster of the second clusters. The method 1000 can further include producing data indicating the locations of overlap in which to place both (a) a sensor of the first sensors and (b) a second sensor of the second sensors.

The method 1000 can further include, wherein the feature vector includes, for each cell of the cells, an average of the image data corresponding to the cell and soil data corresponding to the cell for one or more of the physical characteristics. The method 1000 can further include, wherein the feature vector includes a row of data for each cell of the cells, each row including data for that cell. The method 1000 can further include, wherein generating the matrix includes using a radial basis function with the feature vector as input. The method 1000 can further include, wherein the radial basis function is a Gaussian radial basis function. The method 1000 can further include, wherein producing the data indicating a cluster of clusters to which each cell of the cells belongs includes using a k-means clustering unsupervised machine learning technique.

Microclimate Mapping

Current area mapping and analysis applications require use of a detailed sensor map of an area for generating and displaying data. The data is commonly generated in the form of a precision map that shows, for example, parameters measured by sensors at specific locations. These applications may include, for example, applications used in agriculture, forestry, mining, climate monitoring, or security. The measured parameters may include parameters such as soil moisture, ground temperature, soil acidity level, ground movement, or any other appropriate parameter. Current applications rely on a deployment of sensors within an area to provide a detailed sensor map. The deployment of sensors must normally be extremely dense in order to provide accurate data about the area. This dense deployment of sensors requires a large number of sensors which is expensive. For example, accurate sensors for agricultural applications are expensive. The deployment of even one sensor per acre quickly becomes cost-prohibitive for most farmers.

Other current area mapping and analysis applications may rely on the use of videos taken from aerial vehicles (AVs) such as drones (i.e., unmanned aerial vehicles (UAVs)) or helicopters performing a flyover of an area to provide video data for a detailed map. However, a video taken from an AV may not provide actual ground data. For example, in agricultural applications videos taken from AVs do not have detailed information about actual soil health, such as moisture content, temperature, or acidity level. In these applications that use an AV, a dense deployment of sensors would be needed to provide actual accurate ground data about the area.

The embodiments of the disclosure provide technical advantages by allowing use of a sparse deployment of sensors that requires fewer sensors and incurs less expense then currently used methods of creating sensor maps. Implementations of the embodiments include systems, apparatus and methods that compress video data captured from an AV into an aerial orthomosaic overview of an area. The orthomosaic may then be processed in combination with sensor values, measured by sensors sparsely deployed in the area, to generate precision maps for the area, including areas in which no sensors are deployed. For example, sensors that directly measure soil temperature at locations in the area may inform a machine learning pipeline to make predictions or extrapolations about other locations in the area by considering spatial proximity of the other locations to the deployed sensors. Visual similarity of the areas of the other locations as compared to areas within which the sensors are deployed may also inform the machine learning pipeline to make predictions about the other locations.

The embodiments also provide an advantage through the conversion and compression of the video data into the orthomosaic which results in a robust orthomosaic with few visual artifacts. The robust orthomosaic then allows resource efficient extrapolation of sensor data and generation of precision maps. In implementations of the embodiments, selected elements of aerial 3D mapping techniques are combined with selected elements of image stitching techniques. The new techniques that use the combination of the selected elements are also more robust than currently used techniques that use either aerial 3D mapping or aerial image stitching alone. In addition, the implementations are faster than currently used aerial 3D mapping techniques. This is because the implementations avoid several computationally expensive processing steps used in the current 3D mapping techniques. For example, the embodiments of the disclosure do not require construct of a dense digital surface model (DSM) of the terrain from an aerial video. This avoids the need for the high-resolution depth maps used to create accurate DSMs in current 3D mapping techniques. The creation of DSMs is both computationally and memory intensive, and may not be suitable for resource constrained systems.

The compression of video data into an orthomosaic according to embodiments may provide advantages in that the orthomosaic may include much less data than the original video data. For example, the orthomosaic may be an order of magnitude smaller than the video at full resolution. This provides advantage when the video data is being processed in a device in a weakly connected internet setting, (e.g., when a connection to the internet is only available to the device over an intermittent or over a slow/low bandwidth connection). For example, sending large data files such as videos over an Internet connection takes time, and may also cost more than sending conventionally sized data files. These problems may be especially acute for internet of things (IoT) applications that use high volume data collecting devices such as AVs that collect video data. A typical high definition AV video made during a 15-minute flight may commonly exceed a gigabyte (GB) in size. Sending an entire video of this size over a weak internet connection for processing in a cloud network may take a long time. In the weakly connected setting, a user may find the time it takes to send such a large video file unacceptable because of the slow connection speed, or because the connection is only available intermittently. Services that utilize the video may then be degraded as far as service latency and quality of service. Other services relying on the same weak internet connection may also be degraded when the large video file is sent. In the embodiments, only the orthomosaic and sensor data need be sent to a cloud network rather than the whole video. The cloud network may then reconstruct the precision maps based on the orthomosaic and sensor data.

Some embodiments may construct a dynamic, precision map that captures and presents the temporal variations of various environmental parameters on an area. The precision map may be constructed by generating an orthomosaic from a flyover video taken from an AV and then processing the orthomosaic in combination with sensor data to generate the precision map. The flyover videos may be generated at first time intervals. The sensor data may be received at second time intervals shorter than the first time intervals, so the sensor data is received at a higher frequency than the video data. Each time new video data is received the orthomosaic used for generating the precision map may be updated. Each time the sensor data is received from the precision map may be updated based on the current orthomosaic. This provides an advantage when the sensor data changes more quickly than the video data. Video data may be days or weeks old but the precision map may be kept up to date with current sensor data.

Figure 11A:
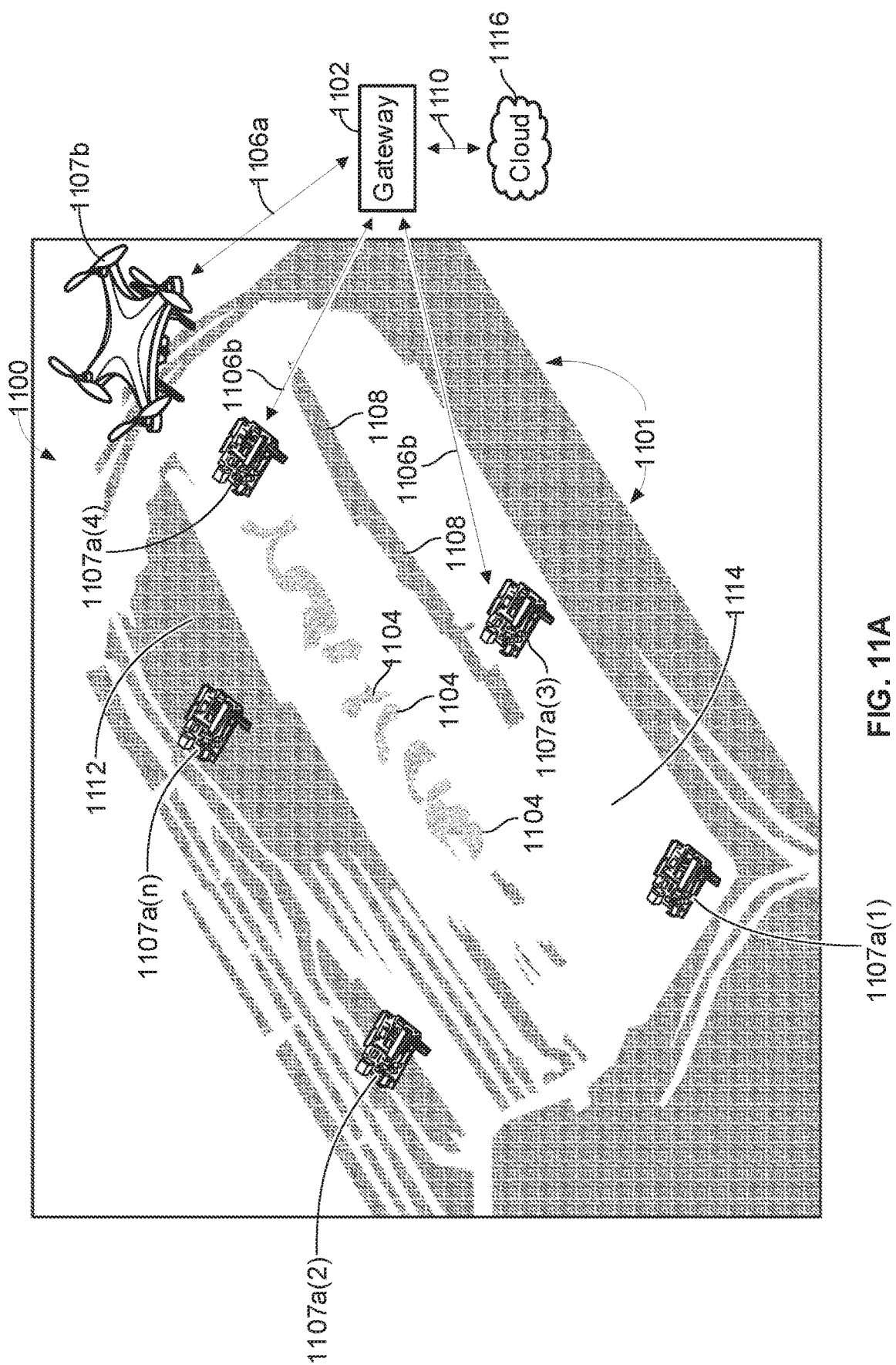
FIG. 11A is an illustration of an example system implemented in an area for agricultural application.

An example scenario in which the embodiments provide an advantage may include an agricultural setting in a remote area. To avoid transmitting gigabytes of drone video and sensor data to the cloud over a weak internet connection in the agricultural setting, video processing may be performed locally on a low-cost PC, or a similar apparatus/machine functioning as a gateway. The gateway may be located at a farmer's home or office and collect information from ground sensors sparsely deployed in an area of the farm. The farmer may also use an AV to perform overflies of the area to create videos which are sent to the gateway. The gateway may compress the video and sensor data into summarized precision maps of the farm. To do so, the gateway first converts the drone video into a detailed orthomosaic of the farm and extrapolates the sensor readings to generate a precision map of the farm according to embodiments. In some embodiments, the gateway may send the orthomosaic and sensor data to the cloud. This reduces the size of data transmitted to the cloud by an order of magnitude or more. In some embodiments, the gateway may only send the precision maps to the cloud. This further reduces the size of data transmitted to the cloud by another order of magnitude. In this way, the gateway may enable long-term as well as cross-farm analytics in cloud services, while still continuing to provide near real-time analytics locally to the farmer, such as through a web-based interface in the gateway FIG. 11A is an illustration of an example system implemented in an area for agricultural application. In FIG. 11A, system 1100 is shown as implemented in an example area 1101 which may be an area of a farm for growing crops or maintaining livestock. System 1100 includes gateway 1102. Gateways 1102 may be configured to communicate with a cloud network over link 1110. Link 1110 may include, for example, a hypertext transfer protocol (HTTP) or advance messaging queuing protocol (AMQP) connection implemented over a local internet/cloud interface such as a connection. Gateway 1102 may receive data from devices such as one or more sensors 1107a(1)-1107(n), over wireless interfaces 1106b implemented using television white space (TVWS) spectrum, Wi-Fi spectrum, or any other suitable wireless spectrum. Use of TVWS spectrum, which is in the lower frequencies, allows signals to propagate much farther than signals in 2.4 GHz or 900 MHz of the spectrum. TVWS signals may also propagate through the leaves and crop canopies of a remote environment. Sensors 1107a(1)-1107(n) may include sensors to measure soil temperature, soil moisture at different depths, soil acidity (pH), and normalized vegetation index (NDVI) using on-field IR sensors/cameras, or other sensors discussed herein. The one or more sensors 1107a(1)-1107(n) are not shown to actual size, and would normally be smaller in relation to the dimensions of the area 1101. The sensors 1107a(1)-1107(n) may communicate the data to gateway 1102 using protocols such as message queuing telemetry transport (MQTT) or transport control protocol (TCP), depending on the configurations of the particular sensors 1107a(1)-1107(n) that are used. FIG. 11A also shows unmanned aerial vehicle (UAV) 1107b. UAV 1107b may be any type of UAV that includes a video camera. For example, UAV 1107b may be a quadcopter UAV that includes a high-resolution video camera. UAV 1107b may be controlled by an auto-pilot application. Video data may be received by gateway 1102 from UAV 1107b over link 1106a using, for example, file transfer protocol (FTP). In the example of FIG. 11A, the gateway 1102 and sensors 1107a(1)-1107(n) and/or UAV 1107b may include a local network. In other implementations a piloted aerial vehicle may be used in place of UAV 1107b.

Area 1101 is shown as including various differentiated areas. Area 1104 may represent an area darker in color and wetter than surrounding areas. Area 1112 may represent an area of particular plants/vegetation. Area 1108 may represent another area of other plants/vegetation. Area 1114 may represent a dirt area without plants or vegetation.

In an embodiment of system 1100, gateway 1102 may include a gateway that is located in a weakly connected setting, (e.g., in a setting in which connections over the local internet/cloud interface for link 1110 is only available intermittently, and/or is only available with poor quality or low speed/low bandwidth connections). Gateway 1102 may provide local services though user interfaces and/or connected devices for users located in the service area of gateway 1102. The services may include local services that do not require communication with cloud network 1116. The services may also include local services that require communication with cloud network 1116. Use of data from gateway 1102 may also enable provision of cloud services to users located remotely from gateway 1102. Data that is communicated to the cloud network 1116 from gateway 1102 may also be combined with other data, such as weather data or data from gateways operating in other agricultural areas, in the cloud network 1116 in order to provide enhanced cloud based services on a more global scale.

System 1100 has application in any situation where an area may be monitored/analyzed using video data and/or sensor data. For example, system 1100 may have application for use in providing services to other operations such as mining, mapping, geographical research, oceanography, environmental research, forestry, security, or surveillance over any type of area.

Figure 11B:
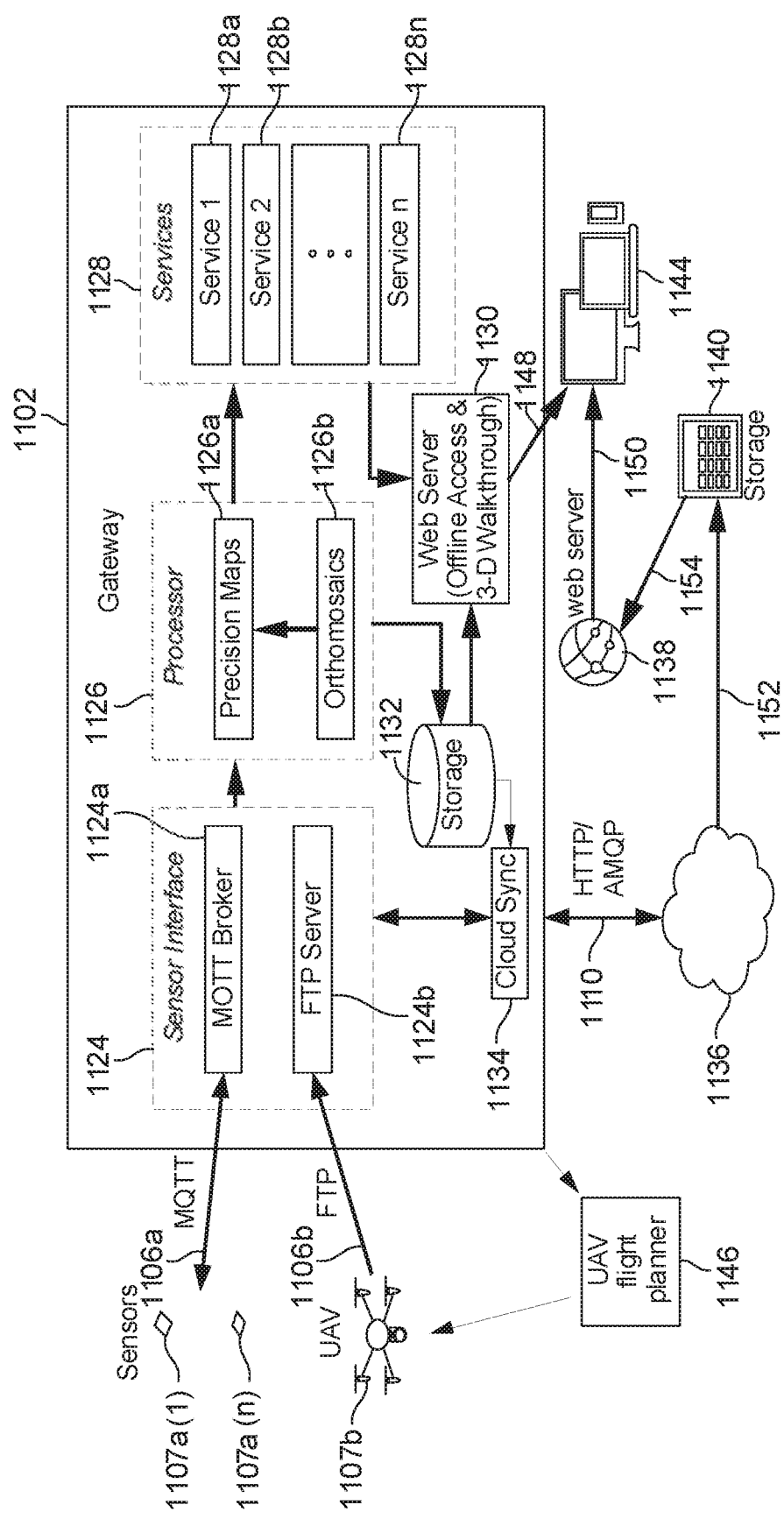
FIG. 11B is a simplified diagram illustrating portions of an example gateway.

FIG. 11B is a simplified diagram illustrating portions of an example gateway. Gateway 1102 of FIG. 11B illustrates an example implementation of gateway 1102 of FIG. 11A. Gateway 1102 may include sensor interface 1124, processor 1126, service functions 1128, web server 1130, storage 1132, and cloud sync 1134. Processor 1126 includes precision maps function 1126a and orthomosaic function 1126b. Sensor interface 1124 includes MQTT broker 1124a for receiving sensor data from environmental sensors 1107a(1)-1107(n) over a MQTT link 1106a. Sensor interface 1124 also includes FTP server 1124b for receiving video data from one or more video cameras on UAV 1107b over FTP link 1106b. Orthomosaic function 1126b generates orthomosaics from video data. Precision maps function 1126a generate precision maps from the orthomosaics and the sensor data.

Gateway 1102 may also be connected to a UAV flight planner 1146 implemented in a computing device. For example, UAV flight planner 1146 may be implemented as an application in a smartphone, tablet computer, laptop computer or desktop computer connected to gateway 1102 by a Wi-Fi or other type of connection. UAV flight planner 1146 may communicate with, and control, UAV 1107b over a radio control link configured in the device in which the UAV flight planner 1146 is implemented. UAV flight planner 1146 may also communicate with, and control, UAV 1107b through gateway 1102, for example over FTP link 1106b. In an alternative implementation, UAV flight planner 1146 may be implemented as part of gateway 1102. Webserver 1130 of gateway 1102 may also be connected to one or more devices 1144 through, for example, a Wi-Fi link 1148 to allow gateway 1102 to provide local network services to a user of devices 1144 without requiring a cloud connection (e.g., while offline). Gateway 1102 also may be connected to the cloud network 1116 though HTTP/AMQP link 1110. The cloud network 1116 may provide cloud services based on the data received from gateway 1102 and/or received from other gateways. Devices 1144 may also provide users access to a remote webserver 1138 to allow users to access services provided by the cloud network 1116 when internet/cloud connections are available. The link 1150 from devices 1144 to webserver 1138 may be implemented over the same weakly connected local Wi-Fi internet/cloud interface as is HTTP/AMQP link 1110. Cloud network 116 may also include a connection to a global storage 1140 that stores data for use by cloud services.

In an example implementation, gateway 1102 may be implemented in an agricultural setting including an area such as area 1101 of FIG. 11A. In the agricultural setting, gateway 1102 may be implemented as a gateway connecting a local network to the internet/cloud 1116. The local network may include sensors 1107a(1)-1107(n) and UAV 1107b from which gateway 1102 receives data. In one example implementation, the local network may provide agricultural services to the owner of a farm within which the local network including gateway 1102 is configured.

The local network may be configured for efficient provision of services despite a lack of inexpensive internet/cloud connectivity in the fields, and despite a slow and unreliable network connection to cloud network 1116 from elsewhere in the local network, for example, from the farmer's house or office. Services may be provided using a task allocation and data transfer scheme between gateway 1102 and cloud network 1116 that allows for efficient provision of both local services, and cloud services in the weakly connected setting.

Various sets of data generated during the process of creating precision maps, such as the orthomosaic and sensor data, may also be backed up in storage 1132 for sending to the cloud network 1116 to enable cross-farm (i.e., between different farms) and long-term analytics performed in the cloud network 1116. The various sets of data may be queued for sending to the one or more cloud network base on assigned priorities that allow for efficient provision of both local and cloud services given the weakly connected setting. The task allocations and the various sets of data may be configured to avoid sending large data sets on the weakly connected setting.

Figures 12A, 12B:
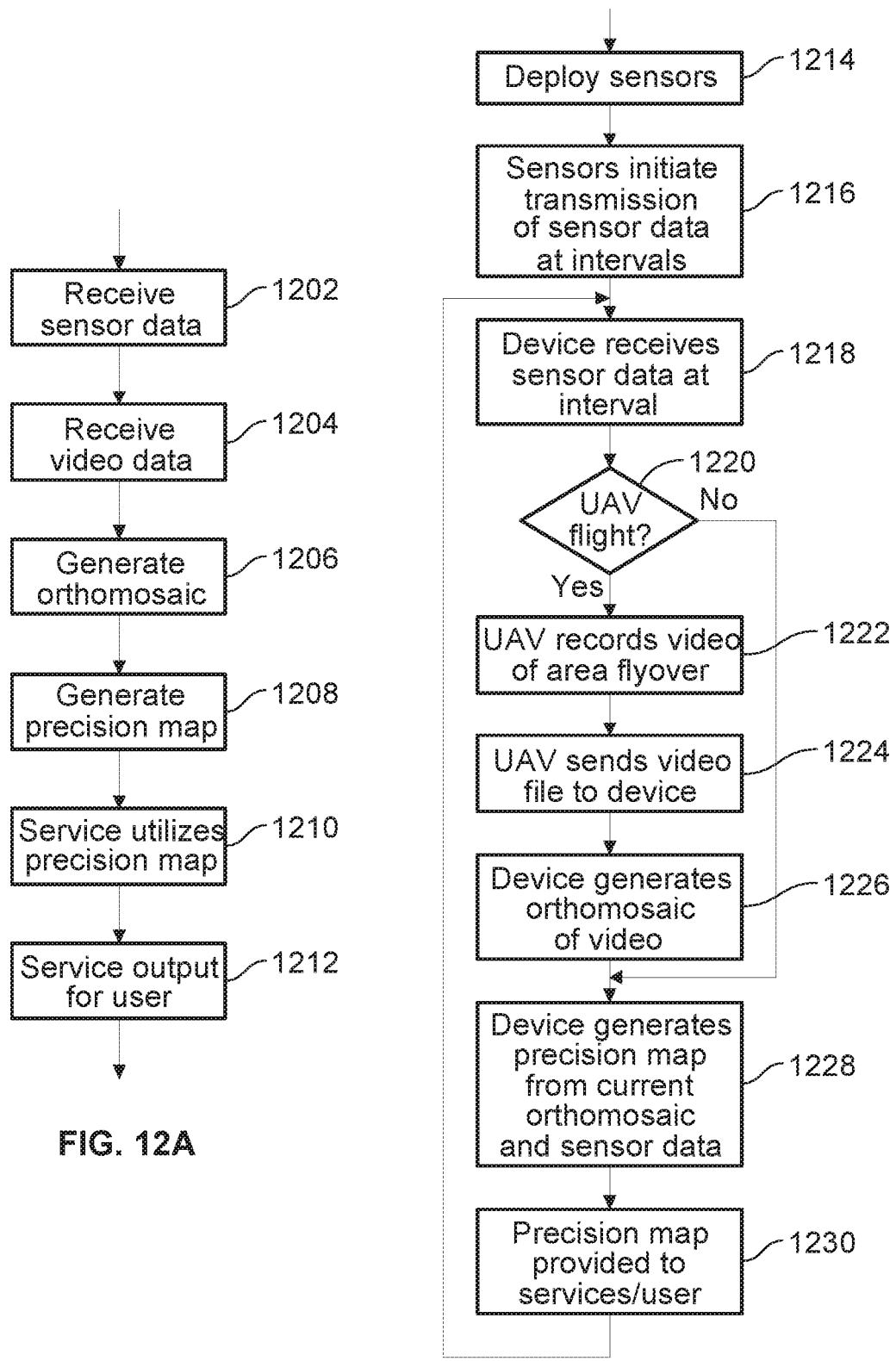
FIG. 12A is a flow diagram illustrating operations performed in an example gateway.
FIG. 12B is a flow diagram illustrating further operations performed in an implementation of the process of FIG. 12A.

FIG. 12A is a flow diagram illustrating operations performed in an example gateway. FIG. 12A may be explained with reference to gateway 1102 of FIGS. 11A and 11B. At 1202, sensor interface 1124 of gateway 1102 receives sensor data from each of sensors 1107(a)-1107(n). The sensor data may be generated from sensor readings performed by each of sensors 1107a(1)-1107(n) to measure a parameter in a portion or block of area 1101 in which each sensor of sensors 1107a(1)-1107(n) is located. For example, sensor 1107a(1) may generate sensor readings for a portion of area 1101 in which sensor 1107a(1) is located, and sensor 1107a(2) may generate sensor readings for a similar sized portion of area 1101 in which sensor 1107a(2) is located. Area 1101 may be divided into a plurality of similar sized portions, some of which contain deployed sensors and other portions that do not contain any sensor. The size of the portions may depend, for example, on the particular types of parameters being measured, the number of actual sensors that are deployed, and/or on a desired granularity/accuracy of a precision map to be generated.

At 1204, sensor interface 1124 of gateway 1102 receives video data from UAV 1107b. The video data is provided to orthomosaic function 1126b of processor 1126 to generate an orthomosaic. The video data, which may include several gigabytes of data, is converted by orthomosaic function 1126b into an orthomosaic that includes a compact representation of an aerial view red-green-blue (RGB) color image of the area 1101. In one example implementation, the orthomosaic may be constructed from the UAV video using a hybrid technique which combines components from both 3D mapping and mosaicking to construct the orthomosaic. For example, techniques from aerial 3D mapping may be used to estimate the relative position of different video frames without computing expensive high resolution digital surface maps. This allows the inaccuracies due to non-planar nature of area 1101 to be removed. Once the relative positions have been computed, the images may be stitched together using mosaicking techniques to generate the orthomosaic.

At 1208, precision map function 1126a of processor 1126 generates a precision map. The orthomosaic is provided to the precision map function 1126a. Precision map function 1126a uses the sensor data, received at 1202, along with visual features in the orthomosaic, to determine a prediction model/function for extrapolating the sensor readings to create a precision map or update an existing precision map. For example, sensor data received from sensors 1107a(1)-1107a(n) that measures soil temperature at the locations of sensors 1107a(1)-1107(n) allow precision map function 1126a to make predictions about every location in the farm. This may be done by considering spatial proximity as well visual similarity of the locations to the sensors 1107a(1)-1107(n). Visual similarity may be determined by analyzing spatial and visual smoothness. Areas that have similar spatial and visual smoothness may be considered to have similar sensor readings.

Precision map function 1126a uses the prediction model and the latest sensor data to generate one or more precision maps of area 1101. Precision map function 1126a may use the prediction model to extrapolate the received sensor data to determine a predicted level of the measured parameter in each of the plurality of portions of the area that do not contain one of sensors 1107a(1)-1107a(n) and generate a precision map. The precision map may include a moisture map, pH map, temperature map, or a map of other parameters. The precision map may include data that is displayable to indicate the level of the parameter in each of the portions of area 101 that include sensors 1107a(1)-1107a(n) and, also, may indicate a level of the parameter in each of portions of the area 101 that contain no sensors.

At 1210 services 1128 of gateway 1102 may use the precision map. For example, the map may be displayed to a user of gateway 1102 to allow the user to observe moisture levels, pH level, temperature levels, or other parameters in the area 1101. Service 1128 may also include applications that may provide, at 1212, management instructions or plans, such as irrigation or fertilizing programs, based on the precision map.

FIG. 12B is a flow diagram illustrating further operations performed in an implementation of the process of FIG. 12A. The process begins at 1214 where sensors 1107a(1)-1107a(n) are deployed to monitor the environment of portions of area 1101. Sensors 1107a(1)-1107a(n) may be used to monitor soil temperature, moisture, soil pH, etc., in the proximity of each of the sensors 1107a(1)-1107a(n) and generate sensor data. At 1216, sensors 1107a(1)-1107a(n) initiate transmission of sensor data to gateway 1102 at intervals. The sensor data may be sent to gateway 1102 at predetermined times, for example every 10 minutes, or at any other periodic or irregular time schedule as appropriate to collect relevant data.

At 1218, gateway 1102 begins to receive the sensor data from sensors 1107a(1)-1107a(n) at sensor interface 1124 over MQTT interface 1106a at the intervals at which the sensor data is sent. Gateway 1102 may continue to receive the sensor data at each interval throughout the process of FIG. 2B. Sensor interface 1124 may provide the sensor data to processor 1126 for processing. Processor 1126 may also queue the received sensor data in storage 1132 for sending to cloud network 1116 by cloud sync 1134. The sensor data may be assigned a time sensitive priority for sending. In a weakly connected setting, this causes the sensor data to be sent to cloud network 1116 with a preferred priority when the connection is intermittent or of low quality/low speed bandwidth. In the implementation of FIG. 12B, each time new sensor data is received at 1218 the process may move to 1220.

At 1220, gateway 1102 determines if it is time to send UAV 1107b on a flight to collect video data over the area 1101 in which sensors 1107a(1)-1107a(n) are located. The flights of UAV 1107b may be timed to occur at intervals that are longer than the intervals at which sensor data is received at 1218. If it is determined that it is not time for a UAV flight, the process moves to 1228. If however, it is determined at 1220 that it is time for a UAV flight, gateway 1102 sends a notification to UAV flight planner 1146 and UAV 1107a is flown over the area in which sensors 1107a(1)-1107a(n) are located to record a video of an aerial view of the area 1101. In an implementation, the UAV flights may be initiated by gateway 1102, or another device communicating with gateway 1102 in the local network, on a predetermined basis, for example once or twice every 24 hours or several times a week. In another implementation, the UAV flights may be initiated by receipt of user input at a device in which UAV flight planner 1146 is installed, such as, for example, computer device 1144 when a user desires to collect video data. The flight of UAV 1107a may be directed by a user of UAV flight planner 1146 or may be an automatically controlled flight. At 1224, UAV 1107b sends video data of the flyover to gateway 1102. Gateway 1102 receives the video data over FTP interface 1106b at FTP server. The video data is then input from sensor interface 1124 to orthomosaic converter 1126b of processor 1126.

At 1226, the video data, which may include several gigabytes of data, is converted by orthomosaic function 1126b into an orthomosaic that includes a compact representation of an aerial view RGB color image of the area in which the sensors 1107a are located. In one example implementation, the orthomosaic may be generated from the UAV video using the hybrid technique as described for operation 1206 of FIG. 12A. Processor 1126 also queues the orthomosaic in storage 1132 for sending to cloud network 1116 by cloud sync function 1134 when a cloud connection for sending the orthomosaic is available. In an implementation, the orthomosaic may be assigned non-time sensitive priority. The non-time sensitive priority causes cloud sync function 1134 to send the orthomosaic on a low priority basis when a cloud connection is available. In a weakly connected setting, this causes the orthomosaic to be sent to the cloud network 1116 with a low priority when the connection is intermittent or of low quality/low speed bandwidth. Cloud network 1116 may then use the orthomosaic to generate an updated precision map for online services 1120 and 1122.

At 1228, gateway 1102 generates a precision map from the mosaic and/or current sensor data. If operation 1228 is entered from operation 1226, the mosaic generated at operation 1226 is used along with the current sensor data. In this case, the orthomosaic and current sensor data are input to the precision map function 1126a in processor 1126 of gateway 1102. Precision map function 1126a uses the current sensor data along with visual features in the current orthomosaic, to determine a prediction model/function for extrapolating the sensor readings to generate a precision map or generate an updated precision map. In one example implementation, the precision map may be generated as described for operation 1208 of FIG. 12A. If operation 1228 is entered from operation 1220, the current sensor data (latest sensor data received) is used to update the precision map. In this case, precision map function 1126a uses an existing prediction model/function created from a previous orthomosaic for extrapolating the sensor readings to update a precision map.

At 1228, processor 1126 may also queue any updated data/information associated with the function for extrapolating the sensor readings in storage 1132 for sending to cloud network 1116. In an implementation, the data/information associated with the function for extrapolating the sensor readings sensor may be assigned a time sensitive priority for sending to the cloud network 1116. In a weakly connected setting, this causes the data/information for extrapolating the sensor readings to be sent to cloud network 1116 with a preferred priority when the connection is intermittent or of low quality/low speed bandwidth. Cloud network 1116 may then use the data/information associated with the function for extrapolating the sensor readings for time critical analysis by updating mosaics and sensor data currently being used in cloud network 1116 for providing services. For example, if sensors 1107a(1)-1107a(n) monitor conditions that change quickly, such as moisture or temperature, updated data/information associated with the function for extrapolating the sensor readings will allow cloud network 1116 to use current data/information associated with the function for extrapolating the sensor readings for analysis and provide up to date analysis. The data/information associated with the function for extrapolating the sensor readings may be assigned the preferred priority based on that data requiring less bandwidth and be easier to transmit without error or interfering with other data transmission in the weakly connected setting.

In the process of FIG. 12B, each time gateway 1102 receives new video data at 1224, precision map function 1126a makes adjustments to the prediction modelfunction for extrapolating the sensor readings using the new video data. Precision map function 1126a then uses the orthomosaic RGB color image together with the current sensor data to generate/update one or more precision maps of area 1101. Also, upon receiving updated sensor data at intervals when no new video data is available, precision map function 1126a may use the sensor data and existing prediction modelfunction to update the precision map. This would happen when the process moves from operation 1218 to 1228 by bypassing operations 1222 to 1226. This allows the precision map to be kept current with the received sensor data, even though video data is not received by gateway 1102 as often as sensor data. Video data may be days or weeks old but the precision map may be kept up to date with current sensor data. This is useful when the sensor data changes more rapidly than the video data.

At 1230, processor 1126 provides the precision map to services 1128. The precision maps may then be accessed and utilized by service function 1128 to provide services at gateway 1102. Service function 1128 may include services, such as service-1 1128a through service-n 1128n, each of which may be a service that utilizes a precision map. For example, a precision map may be used to provide services by generating information to a user about what tasks need to be performed, and where the tasks need to be performed on the farm. In an example implementation, an irrigation service may utilize a moisture map to provide information about the amount of water to use for irrigation on different parts of a farm. In another example, a precision pH service may utilize a pH map to provide information or recommendations about how much lime to apply on different parts of a farm to reduce the acidity of the soil in those regions. Processor 1126 may also store the one or more precision maps in storage 1132.

Use of cloud sync component 1134 ensures that the relevant data is backed up in the cloud for data access outside the agricultural network (e.g. when the farmer is travelling), for long term studies, and for cross-farm analytics. Because the video data received from the UAV is large in size, and the internet/cloud connection is weak, the UAV video data is not sent to the cloud. The video data may be kept in local storage 1132 for a predefined duration, after which the video data may be deleted. In other implementations, additional levels of priority may be used for queuing data for sending from gateway 1102 to cloud network 1116. For example, a level of intermediate time sensitive, which has may have a priority between time sensitive and non-time sensitive, may be assigned.

A microclimate map may include microclimate predictions, as previously discussed, that is a sparse collection of data points, (e.g., soil temperature, soil moisture, wind etc. and predicting microclimate variables such as solar radiation, leaf wetness, and evapotranspiration). From these predicted values at specific, and limited points in a geographical area, a high precision map may be generated where all the 'in-between' points are interpolated by techniques discussed.

In short, sensor data points may be used to predict climate data, then a higher precision map of those microclimate variables of interest may be generated, such as by interpolating between the data points.

Machine

Figure 13:
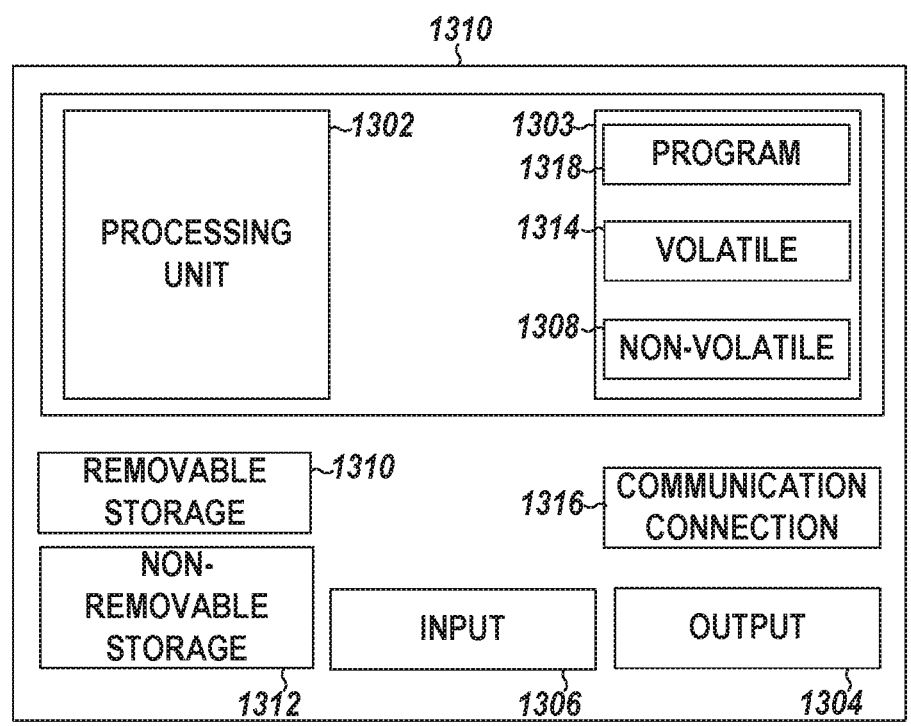
FIG. 13 illustrates, by way of example, a block diagram of an embodiment of a machine (e.g., a computer system) to implement one or more embodiments, such as one or more of the techniques or methods described herein.

FIG. 13 illustrates, by way of example, a block diagram of an embodiment of a machine 1300 (e.g., a computer system) to implement one or more embodiments, such as one or more of the techniques or methods described herein. One example machine 1300 (in the form of a computer), may include a processing unit 1302, memory 1303, removable storage 1310, and non-removable storage 1312. Although the example computing device is illustrated and described as machine 1300, the computing device may be in different forms in different embodiments. For example, the computing device may instead be a smartphone, a tablet, smartwatch, or other computing device including the same or similar elements as illustrated and described regarding FIG. 13. Devices such as smartphones, tablets, and smartwatches are generally collectively referred to as mobile devices. Further, although the various data storage elements are illustrated as part of the machine 1300, the storage may also or alternatively include cloud-based storage accessible via a network, such as the Internet.

Memory 1303 may include volatile memory 1314 and non-volatile memory 1308. The machine 1300 may include—or have access to a computing environment that includes—a variety of computer-readable media, such as volatile memory 1314 and non-volatile memory 1308, removable storage 1310 and non-removable storage 1312. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 1300 may include or have access to a computing environment that includes input 1306, output 1304, and a commnunication connection 1316. Output 1304 may include a display device, such as a touchscreen, that also may serve as an input device. The input 1306 may include one or more of a touchscreen, touchpad, mouse, keyboard, camera, one or more device-specific buttons, one or more sensors integrated within or coupled via wired or wireless data connections to the machine 1300, and other input devices. The computer may operate in a networked environment using a communication connection to connect to one or more remote computers, such as database servers, including cloud based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1302 of the machine 1300. A hard drive, CD-ROM, and RAM are some examples of articles including a non-transitory computer-readable medium such as a storage device. For example, a computer program 1318 may be used to cause processing unit 1302 to perform one or more methods or algorithms described herein.

Additional Notes and Examples

Example 1 includes processing circuitry configured to predict a physical characteristic of a geographic area, the processing circuitry configured to receive sensor data from sensors situated in the geographic area, produce a feature vector including a time series of values corresponding to the sensor data, and using a neural network, estimate the physical characteristics, the physical characteristics including at least one of (a) a leaf wetness, (b) a solar radiation, (c) an evapotranspiration, (d) a future soil moisture, and (e) a future soil temperature.

In Example 2, Example 1 can further include, wherein the processing circuitry is further configured to receive past or predicted weather data from a weather provider, and include a time series of values corresponding to the weather data as part of the feature vector.

In Example 3, Example 2 can further include, wherein the weather provider includes one of (a) a physical weather station within a specified distance from the geographical region and (b) a web service that provides past weather data and a weather forecast.

In Example 4, at least one of Examples 1-3 can further include, wherein the sensor data includes at least three of air temperature, relative humidity, dewpoint, soil moisture, soil temperature, average wind speed, maximum wind speed, and rainfall.

In Example 5, Example 4 can further include, wherein the physical characteristics include current solar radiation, leaf wetness, and evapotranspiration.

In Example 5, Example 5 can further include, wherein the sensor data includes all of air temperature, relative humidity, dewpoint, soil moisture, soil temperature, average wind speed, maximum wind speed, and rainfall.

In Example 7, Example 5 can further include, wherein the processing circuitry is further configured to use a value corresponding to an estimated leaf wetness as part of the feature vector, and estimate a future value for at least one of (a) the leaf wetness, (b) soil moisture, and (c) soil temperature based on the feature vector.

In Example 8, at least one of Examples 1-7 can further include, wherein the neural network is a convolutional neural network or a recurrent neural network.

In Example 9, at least one of Examples 1-8 can further include, wherein the processing circuitry is further configured to generate a microclimate map based on the estimated physical characteristics, the microclimate map including the estimated physical characteristics at locations corresponding to locations of the sensors in the geographical area and values for the physical characteristics interpolated between the locations of the sensors.

Example 10 includes a non-transitory machine-readable medium including instruction that, when executed by a machine, configure the machine to perform operations to predict a physical characteristic of a geographic area, the operations comprising producing a feature vector including a time series of values corresponding to sensor data from sensors of the geographic area, and using a neural network, estimating the physical characteristics, the physical characteristics including at least one of (a) a leaf wetness, (b) a solar radiation, (c) an evapotranspiration, (d) a future soil moisture, and (e) a future soil temperature.

In Example 11, Example 10 can further include, wherein the operations further include receiving past or predicted weather data from a weather provider, and including a time series of values corresponding to the weather data as part of the feature vector.

In Example 12, Example 11 can further include, wherein the weather provider includes one of (a) a physical weather station within a specified distance from the geographical region and (b) a web service that provides past weather data and a weather forecast.

In Example 13, at least one of Examples 10-12 can further include, wherein the sensor data includes at least four of air temperature, relative humidity, dewpoint, soil moisture, soil temperature, average wind speed, maximum wind speed, and rainfall.

In Example 14, Example 13 can further include, wherein the physical characteristics include current solar radiation, leaf wetness, and evapotranspiration.

In Example 15, Example 14 can further include, wherein the sensor data includes all of air temperature, relative humidity, dewpoint, soil moisture, soil temperature, average wind speed, maximum wind speed, and rainfall.

Example 16 includes a method for predicting a physical characteristic of a geographic area, the method comprising receiving sensor data from at least three different types of sensor situated in the geographic area, the types of sensors including an air temperature sensor, relative humidity sensor, dewpoint sensor, soil moisture sensor, soil temperature sensor, average wind speed sensor, maximum wind speed sensor, and a rainfall sensor, producing a feature vector including a time series of values corresponding to the received sensor data, and using a neural network, estimating the physical characteristics, the physical characteristics including at least one of (a) a leaf wetness, (b) a solar radiation, (c) an evapotranspiration, (d) a future soil moisture, and (e) a future soil temperature.

In Example 17, Example 16 can further include, wherein the operations further include receiving past or predicted weather data from a weather provider including one of (a) a physical weather station within a specified distance from the geographical region and (b) a web service that provides past weather data and a weather forecast, and including a time series of values corresponding to the weather data as part of the feature vector.

In Example 18, at least one of Examples 16-17 can further include, wherein the physical characteristics include current solar radiation, leaf wetness, and evapotranspiration.

In Example 19, at least one of Examples 16-18 can further include, wherein the operations further include using a value corresponding to an estimated leaf wetness as part of the feature vector, and estimating a future value for at least one of (a) the leaf wetness, (b) soil moisture, and (c) soil temperature based on the feature vector.

In Example 20, at least one of Examples 16-19 can further include, wherein the sensor data includes all of air temperature, relative humidity, dewpoint, soil moisture, soil temperature, average wind speed, maximum wind speed, and rainfall.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. Processing circuitry configured to predict a physical characteristic of a geographic area, the processing circuitry configured to:
   receive sensor data from each of a plurality of first sensors situated in the geographic area, the first sensors including an air temperature, a relative humidity, a soil moisture, a soil temperature, and a wind speed sensor;
   produce a feature vector including a time series of values corresponding to the received sensor data; and
   using a neural network (NN), the NN trained using a time series of input-output examples of sensor data previously produced by the first sensors and values of the physical characteristic determined by a corresponding second sensor, estimate the physical characteristic based on the produced feature vector to generate the estimated physical characteristic, the physical characteristic and estimated physical characteristic including (a) a leaf wetness, (b) a solar radiation, and (c) an evapotranspiration.

2. The processing circuitry of claim 1, wherein the input-output examples further include past or predicted weather data from a weather provider and the processing circuitry is further configured to:
   receive further past or predicted weather data from the weather provider; and
   include a time series of values corresponding to the weather data as part of the feature vector.

3. The processing circuitry of claim 2, wherein the weather provider includes one of (a) a physical weather station within a specified distance from the geographic area and (b) a web service that provides past weather data and a weather forecast.

4. The processing circuitry of claim 1, wherein the processing circuitry is further configured to:
use a value corresponding to an estimated leaf wetness as part of the feature vector; and
estimate a future value for at least one of (a) the leaf wetness, (b) soil moisture, or (c) soil temperature based on the feature vector.

5. The processing circuitry of claim 1, wherein the NN is a convolutional NN or a recurrent NN.

6. The processing circuitry of claim 1, wherein the processing circuitry is further configured to:
generate a microclimate map based on the estimated physical characteristic, the microclimate map including the estimated physical characteristic at locations corresponding to locations of the sensors in the geographical area and values for the physical characteristic interpolated between the locations of the sensors.

7. A non-transitory machine-readable medium including instruction that, when executed by a machine, configure the machine to perform operations to predict a physical characteristic of a geographic area, the operations comprising:
producing a feature vector including a time series of values corresponding to sensor data from each of a plurality of first sensors in the geographic area, the first sensors including an air temperature, a relative humidity, a soil moisture, a soil temperature, and a wind speed sensor; and
using a neural network (NN), the NN trained using a time series of input-output examples of sensor data previously produced by the first sensors and values of the physical characteristic determined by a corresponding second sensor, estimating the physical characteristic based on the produced feature vector to generate the estimated physical characteristic, the physical characteristic and estimated physical characteristic including (a) a leaf wetness, (b) a solar radiation, and (c) an evapotranspiration.

8. The non-transitory machine-readable medium of claim 7, wherein the input-output examples further include past or predicted weather data from a weather provider and the operations further include:
receiving further past or predicted weather data from the weather provider; and
including a time series of values corresponding to the weather data as part of the feature vector.

9. The non-transitory machine-readable medium of claim 8, wherein the weather provider includes one of (a) a physical weather station within a specified distance from the geographic area and (b) a web service that provides past weather data and a weather forecast.

10. A method for predicting a physical characteristic of a geographic area, the method comprising:
receiving sensor data from each of a plurality first sensors situated in the geographic area, the first sensors including an air temperature sensor, relative humidity sensor, dewpoint sensor, soil moisture sensor, soil temperature sensor, average wind speed sensor, maximum wind speed sensor, and a rainfall sensor;
producing a feature vector including a time series of values corresponding to the received sensor data; and
using a neural network (NN), the NN trained using a time series of input-output examples of sensor data previously produced by the first sensors and values of the physical characteristic determined by a corresponding second sensor, estimating the physical characteristic, the physical characteristic including (a) a leaf wetness, (b) a solar radiation, and (c) an evapotranspiration.

11. The method of claim 10, wherein the input-output examples further include past or predicted weather data from a weather provider and the operations further include:
receiving further past or predicted weather data from the weather provider including one of (a) a physical weather station within a specified distance from the geographical region and (b) a web service that provides past weather data and a weather forecast; and
including a time series of values corresponding to the weather data as part of the feature vector.

12. The method of claim 10, further comprising:
using a value corresponding to an estimated leaf wetness as part of the feature vector; and
estimating a future value for at least one of (a) the leaf wetness, (b) soil moisture, or (c) soil temperature based on the feature vector.

* * * * *